United States Patent [19]

Hoehn et al.

[11] E Re. 30,351

[45] Reissued Jul. 29, 1980

[54] AROMATIC POLYIMIDE, POLYESTER AND POLYAMIDE SEPARATION MEMBRANES

[75] Inventors: Harvey H. Hoehn, Hockessin, Del.; John W. Richter, Kennett Square, Pa.

[73] Assignee: E. I. Du Pont de Nemours and Company, Wilmington, Del.

[21] Appl. No.: 687,639

[22] Filed: May 18, 1976

Related U.S. Patent Documents

Reissue of:

[64] Patent No.: 3,899,309
Issued: Aug. 12, 1975
Appl. No.: 322,800
Filed: Jan. 11, 1973

U.S. Applications:

[63] Continuation-in-part of Ser. No. 273,802, Jul. 20, 1972, abandoned.

[51] Int. Cl.[2] ..... B01D 53/22; B01D 31/00

[52] U.S. Cl. ..... 55/16; 55/158; 210/23 H; 210/500 M

[58] Field of Search ..... 210/22, 500 M, 321, 210/23 H; 55/16, 158

[56] References Cited

U.S. PATENT DOCUMENTS

| | | | |
|---|---|---|---|
| 3,228,877 | 1/1966 | Mahon | 210/22 |
| 3,423,491 | 1/1969 | McLain et al. | 210/500 M X |
| 3,567,632 | 3/1971 | Richter et al. | 210/321 X |
| 3,686,116 | 8/1972 | Rio | 210/500 X |
| 3,723,306 | 3/1973 | Bridgeford | 210/22 |
| 3,744,642 | 7/1973 | Scala et al. | 210/500 |
| 3,957,651 | 5/1976 | Kesting | 210/500 M X |

FOREIGN PATENT DOCUMENTS 2050251 2/1971 France .

*Primary Examiner*—Frank A. Spear, Jr.

[57] ABSTRACT

Gas separation membranes are made from aromatic polyimides, polyesters and polyamides in which the repeating unit of the main polymer chain (a) has at least one rigid divalent subunit, the two main chain single bonds extending from which are not colinear, (b) is sterically unable to rotate 360° around at least one of these bonds, and (c) has 50% or more of its main chain atoms as members of aromatic rings.

24 Claims, 1 Drawing Figure

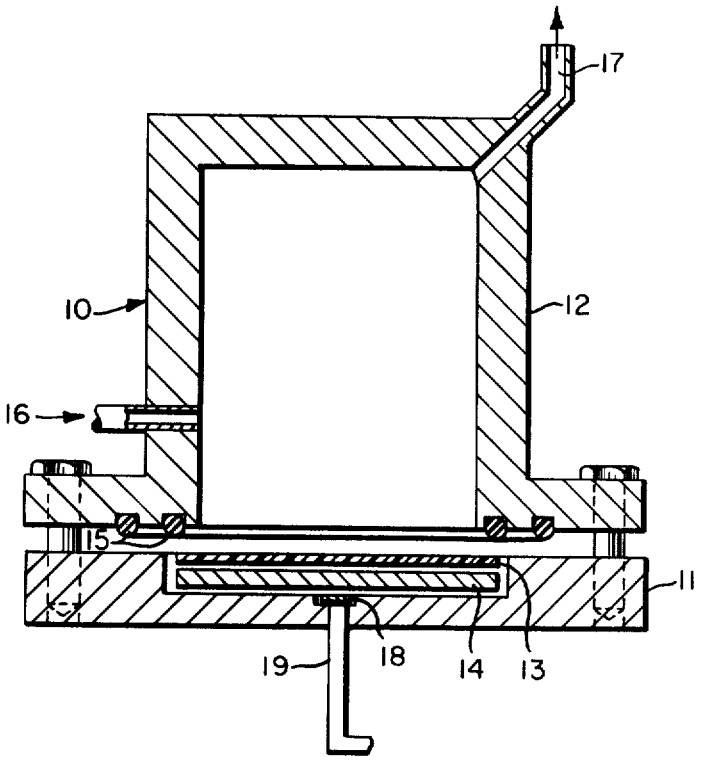
17
10
12
16
15
11
19
18
14
13

AROMATIC POLYIMIDE, POLYESTER AND POLYAMIDE SEPARATION MEMBRANES

Matter enclosed in heavy brackets [ ] appears in the original patent but forms no part of this reissue specification; matter printed in italics indicates the additions made by reissue.

RELATED APPLICATION

This application is a continuation-in-part of our application Ser. No. 273,802 filed July 20, 1972, now abandoned.

BACKGROUND OF THE INVENTION

1. Field of the Invention

This invention concerns semipermeable membranes prepared from a class of polymers whose molecular morphology renders them highly useful in chemical separations.

2. Prior Art

The use of polymeric materials as semipermeable membranes is well known. It is recognized that the chemical constitution of a polymeric material may largely determine its utility in this field and the search for polymers of superior utility continues. In U.S. Pat. No. 3,172,741, Jolley has shown the polymers such as polyacrylonitrile, polyethyleneterephthalate and hexamethyleneadipamide have utility as separation membranes and he points to certain structural characteristics of these polymers which contribute to this utility. In U.S. Pat. No. 3,567,632 Richter and Hoehn disclose permselective membranes from selected polyamides, polyacyl hydrazides, poly-semicarbazides and polyureas. Neither of the patents disclose or suggest the polymeric membranes of this invention.

STATEMENT OF THE INVENTION

The present invention is a gas separation membrane of which at least 50% by weight consists essentially of a polymer whose main chain has a repeating unit containing at least one group selected from the group consisting of aromatic imide, aromatic ester and aromatic amide in which said repeating unit (a) contains at least one rigid divalent subunit, the two main chain single bonds extending from which are not colinear, (b) is sterically unable to rotate 360° around one or more of said main chain single bonds, and (c) more than 50% of the atoms in the main chain are members of aromatic rings.

These criteria define predominantly aromatic polymers whose molecules are unable to pack densely because of having within the repeating unit of the polymer chain at least one main chain single bond which makes an angle with at least one next adjacent main chain single bond and around which the polymer molecule is sterically unable to rotate freely. While it is not intended to be bound by speculation, it is considered that configuratins as defined above render polymer molecules containing them incapable of packing as densely together as polymer molecules without such configurations. Specifically, the bend in the polymer chain caused by the noted angle cannot be accommodated in packing by free rotation around the bond. The structure of the solid polymer is thus kept permanently more "open" to the passage of small gas molecules, resulting in higher flux rates for the passage of such gases.

The polyimides from which membrane materials of this invention are selected may be represented generally as polymers in which the repeating unit is as shown in formula I:

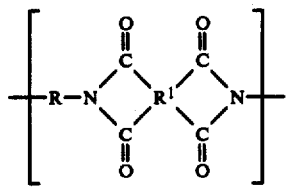

I.

wherein R and $R^1$ are, respectively, divalent and tetravalent organic radicals, i.e., with their bonds stemming from carbon atoms. These are illustrated in more detail below.

The polyesters from which the membrane materials of this invention are selected may be represented generally as polymers in which the repeating unit is as shown in formula II:

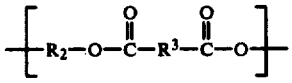

II.

wherein $R^2$ and $R^3$, alike or different, are divalent organic radicals, i.e., with their bonds stemming from carbon atoms. These are also illustrated in more detail below.

The polyamides from which the membrane materials of this invention are selected may be represented generally as polymers in which the repeating unit is as shown in formula III,

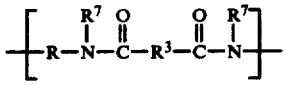

III.

wherein R and $R^3$ are defined as above and $R^7$ is hydrogen, lower alkyl, or phenyl. These are illustrated in more detail below. The term "lower" in the specification and claims means 1–6 carbons.

The particular polyimides, polyesters and polyamides useful as membranes in this invention are selected on the basis of the three criteria noted above. Requirement (a) specifies that the repeating unit of the polymer contain at least one rigid divalent subunit, the two main chain bonds from which are not colinear. The rigid subunits in a polymer chain are those atoms, groups of atoms, or cyclic structures which are joined to other units in the main chain by single bonds between two atoms. The single bond junction points in a polymer main chain are readily recognized from the structural formula of the polymer repeating unit and these points are the demarkation points between rigid subunits. Such a subunit is rigid because the angle between the two single bonds extending from the subunit is fixed. The two bonds from a rigid subunit are colinear (L) if they form an angle of about 180°, (particularly 170°–180°) or if they are parallel and offset not more than 2Å. Otherwise, they are noncolinear (N). Preferred polymers have 2–10 main-chain rigid subunits in the polymer repeating unit.

Requirement (b) specifies that the polymer chain contain at least one bond between rigid subunits around which bond the polymer chain is sterically prevented from rotating 360°. This determination is based on the well-known textbook rules of stereochemistry. These rules are strictly incorporated into the design of the Corey-Pauling-Koltun Models (CPK Models) described by W. L. Koltun in Biopolymers 3, 665–679 (1965) and which are available from the Ealing Corporation, 2225 Massachusetts Avenue, Cambridge, Mass., 02140.

A practical determination of whether a polymer satisfies requirements (a) and (b) is made as follows:

(1) Draw the conventional two-dimensional representation of the polymer repeating unit and indicate the single bonds in the main polymer chain which separate rigid subunits.

(2) For each rigid subunit indicate whether the two main chain bonds stemming from it are colinear (L) or non-colinear (N).

(3) Construct the CPK Model of the polymer unit and from the model determine which of the bonds indicated in (1) are restricted from rotating through 360°. Persons skilled in the field of stereochemistry would, of course, not need the model to make this determination. Illustrations of the above steps and the one which follows appear in the examples below.

The determination of requirement (c) that over 50% of the atoms forming the backbone chain of the repeating unit of the polymer be in aromatic groups can readily be made from the two-dimensional representation of the polymer repeating unit noted above. The main chain atoms which are counted are those in the single atom and cyclic rigid subunits. In cyclic subunits in which the two single bonds stem from different atoms, all member atoms in the basic ring of the subunit are counted, e.g., p-phenylene counts 6 atoms. Side chain atoms such as hydrogen, carbonyl oxygen, alkyl groups, haloalkyl groups, carboxyl groups, ester groups, halogen substituents and other pendant groups are not counted. If both single bonds from a cyclic rigid subunit stem from the same atom, only that one atom is counted, e.g., 1,1-cyclohexylene counts 1 atom, the remaining pentamethylene being a pendant group. Aromatic rings include not only the hydrocarbon aromatic rings such as benzene, naphthalene, anthracene, phenanthrene, pyrene, chrysene, naphthacene, indene, and the like, but also those heterocyclic rings commonly acknowledged to have aromatic character such as furan, benzofuran, dibenzofuran, thiophene, pyrazole, indole, benzimidazle, pyrazine, carbazole, pyridine, quinoline, acridine, imidazole, isoimidazole, and the like. See, for example, R. C. Fuson, "Advanced Organic Chemistry", John Wiley & Sons, Inc., 1950, Chap. XXIV, "Aromatic Character".

In the examples showing the determination of the above criteria, the single bonds separating rigid subunits are marked by drawing dotted lines across the two-dimensional representation of the polymer repeating unit and are identified by the letters A, B, C, D, etc. The rigid subunits are numbered 1, 2, 3, 4, etc. The rigid subunits are then tabulated along with a notation for each whether its two main chain single bonds are colinear (L) or non-colinear (N) and a notation as to which, if any, of these bonds are restricted from rotating 360°. The proportion of the main chain atoms in the repeating unit which are in aromatic structures is also shown.

The invention also contemplates the use of copolyimides, copolyesters and copolyamides in which the respective repeating units of the copolymer members individually satisfy criteria (a), (b), and (c), as well as physical blends of two or more of these materials meeting these criteria and also copolyimides, copolyesters, copolyamides and blends in which one or more members meet these criteria, those members constituting 50% or more of the membrane by weight.

The membranes of this invention may be prepared by any of the known means for forming organic polymers. Membranes in film form may be prepared by melt pressing, melt extrusion, solution casting, and the like. Membranes in tubular or hollow form may be prepared by melt spinning and wet or dry spinning from solution.

When the membranes of this invention are formed from polymer solutions in organic solvents, it may be desirable to incorporate up to 100% by weight of soluble salt, based on the polymer, i.e., a salt which is soluble (and preferably highly dissociated) in the polymer solution to the extent present and which is essentially chemically inert toward the polymer and the solvent. Suitable salts include LiCl, LiBr, $LiNO_3$, $CaCl_2$, etc.

In the membranes of this invention, there may be incorporated up to 50% by weight of the total composition of a compatible plasticizer of the type illustrated by the phthalate esters such as dibutyl, dicyclohexyl, dioctyl and diphenyl phthalates, the aryl sulfonamides such as the N-(lower alkyl)benzenesulfonamides and N-(lower alkyl)toluenesulfonamides, the organic phosphates such as triphenyl and tricresyl phosphate, the adipates such as dioctyl adipate and diisodecyl adipate and similar compatible esters. In solution preparations, the plasticizer may be incorporated by dissolving it in the polymer solution prior to casting or spinning. Plasticizers may also be incorporated by hot blending on mixing rolls or in an extruder prior to the formation of the membrane.

In a preferred embodiment of this invention, a polymer which satisfies requirments (a), (b) and (c) is dissolved at about 20% concentration in an anhydrous organic solvent. The solution is filtered to remove solids and is freed of dissolved gasses. At a temperature in the range from room temperature up to 150° C. the solution is cast in film form on a support or spun through a cored spinneret to give a hollow fiber. The solvent is then removed. For example if a uniform membrane is desired, the solvent is evaporated preferably by heating at about 90° to 110° C. On the other hand if an asymmetric membrane is desired, the film or fiber structure is quenched in a liquid which is a nonsolvent for the polymer and a solvent for the organic solvent and additives already present. Preferably the quench liquid is water and the organic solvent is water-miscible.

Apparatus suitable for separation of gases, as removal of hydrogen from a mixture of hydrogen and methane, by a membrane in film form is shown in the FIGURE. In this FIGURE base section 11 and upper section 12 of permeation cell 10 are machined from corrosion-resistant metal. Film 13, the separation membrane, is a disk mounted against a porous support disk 14. When upper section 12 of the cell is bolted to lower section 11, synthetic elastomer O-rings 15 seat firmly around the periphery of the membrane and against the metal. Inlet 16 for feeding gases into the cell is near the membrane. By-pass of a portion of the feed gas is provided through exit 17. Gas passes through membrane 13 is collected through a metal frit 18 into exit pipe 19. Pipe 19 is connected to a metal gas receiver (not shown) which is fitted with pressure measuring devices.

Some of the terms used to describe the performance of the membranes of this invention are defined as follows:

Selectivity

The selectivity of a membrane in separating a two-component [fluid] *gas* mixture is defined as the ratio of the rate of passage of the more readily passed component to the rate of passage of the less readily passed component. Selectivity may be obtained directly by contacting a membrane with a known mixture of gases and analyzing the permeate. Alternatively, a first approximation of the selectivity is obtained by setting up the ratio of the rates of passage of the two components determined separately on the same membrane. Rates may be expressed as GTR or as cB units.

Gas Transmission Rate (GTR)

One characterization of membrane permeability used in this disclosure is the gas transmission rate. GTR data represents the steady state rate of gas transmission through a membrane. GTR values are not normalized for membrane thickness. For homogeneous membranes the GTR is inversely proportional to the sample thickness. When the thickness of the active part of the membrane is not known, e.g., in asymmetric membranes, the GTR is still a valid permeability characterization. GTR values determine the value-in-use of the membrane in a permeation device. Derivation of the GTR equation follows.

The volume of gas transmitted through a membrane is directly proportional to the area, time, and pressure of the permeation test as shown in (1).

$$\mathrm{GTR} = \frac{\text{volume}}{\text{area} \times \text{time} \times \text{pressure}} \qquad (1)$$

The units selected for volume, area, time, and pressure are $cm^3$ (STP), 100 $in^2$, 24 hours, and atmosphere, respectively. Substituting these units in (1) gives (2):

$$\mathrm{GTR} = \frac{cm^3\,(\mathrm{STP})}{100\ in^2 \times 24\ hr \times atm} \qquad (2)$$

Except in special cases, all measurements of transmitted gas as $cm^3$ (STP) were made at 30° C. GTR values were usually measured at gas pressures of 39.7, 114.7, 314.7, 614.7 and 1014.7 psia.

Centibarrer Permeation Coefficient (cB)

The standard unit for the permeability coefficient in observing the permeability of polymer films to gases is defined as the barrer which is equal to $$\frac{10^{-10}\ cm^3(\mathrm{STP}) \times cm}{cm^2 \times sec \times cmHg} \text{ in which}$$

in which $cm^3$ (STP) is the volume of permeated gas at standard temperature and pressure,
cm is thethickness of the film,
$cm^2$ is the area of film,
sec is the time, and
cmHg is the pressure.

(ASTM Test D 1434–66, 1970 Edition, Part 27, pgs 447 and 453)

In the present application permeabilities are reported in centibarrers (cB), a unit which is 1/100 of the barrer as defined above. Centibarrer values can be calculated from the relationship:

$$cB = GTR \times \text{film thicnkess in mils} \times 0.6.$$

As stated previously, the polymers used in this invention are characterized by having the three elements (a), (b) and (c). As long as these are present in the polymer, R, $R^2$ and $R^3$ may be any divalent organic radical and $R^1$ may be any tetravalent organic radical. It is to be noted it is possible to prepare polymers where all the R's are derived from compounds shown in the various tables below but would still not have elements (a), (b) and (c). Such polymeric materials are not within the scope of the invention, but may be used in combination with the polymers of this invention in amounts up to 50% by weight.

The examples give various illustrations of the radicals which are used. Without any intent of limitation the radicals may be further illustrated as follows:

In formulas I, II and III, the divalent radicals R, $R^2$ and $R^3$ may be substituted or unsubstituted phenylene, naphthylene, biphenylene, anthrylene or

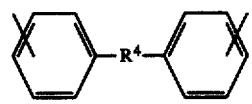

where $R^4$ is alkylene (including alkylidene) of up to 18 carbon atoms, aralkylene of up to 18 carbon atoms, haloalkylene (including haloalkylidene) of up to 18 carbon atoms in which the haogen(s) are fluorine, chlorine, bromine or iodine, oxygen, sulfur, $—SO_2—$,

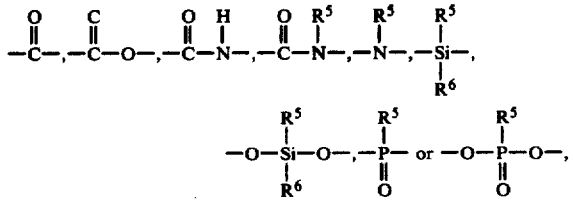

in which $R^5$ and $R^6$ are lower alkyl or phenyl. Preferred embodiments of $R^4$ are alkylidene, haloalkylidene, aralkylidene, oxy and iminocarbonyl (—NH—CO—). Preferred alkylene and haloalkylene moieties in $R^4$ are those of 1–3 carbon atoms.

The tetravalent radical $R^1$ may be a substituted or unsubstituted grouping:

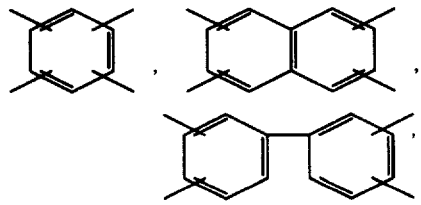

-continued

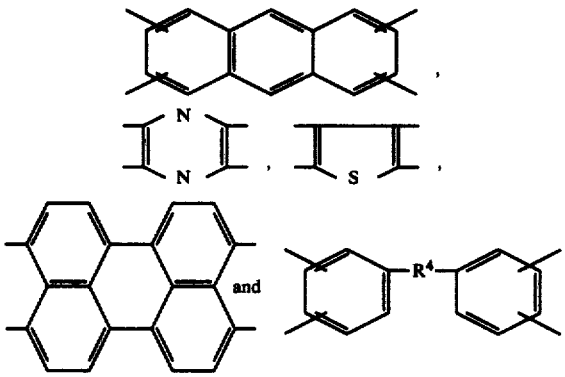

where $R^4$ is defined as above.

Substituents on the above divalent and tetravalent radicals, i.e., replacements for hydrogen in aromatic C—H groups, may be alkyl of up to 18 carbon atoms such as methyl, ethyl, isopropyl, butyl, tert.-butyl, hexyl, and octadecyl, phenyl, halogen such as fluorine, chlorine, bromine and iodine, lower alkoxy, carboxyl, lower alkoxycarbonyl, carbacyl of up to 6 carbon atoms such as acetyl and hexanoyl, sulfo and sulfo salt of an alkali or alkaline earth metal. Preferred embodiments of R, $R^1$, $R^2$ and $R^3$ are those in which the aromatic portions are of the benzene or naphthalene series.

Additional dianhydride radicals are listed in Table 1. Suitable polyimides for use in this invention can be obtained when equivalent amounts of the dianhydrides shown in Table I are substituted, for example, for pyromelletic dianhydride in the procedure of Example 13, Part A.

Additional diamines are listed in Table II. Suitable polyimides can be obtained when equivalent amounts of the diamines shown in Table II are substituted, for example, for 1,5-diaminonaphthalene in the procedure of Example 15, Part A.

Polyesters suitable for use in this invention are obtained when, as in the procedure of Example 1, Part A, 4,4'-diphenylbis(trifluoromethyl)methane dicarboxylic acid dichloride is substituted for example for isophthaloyl chloride and the diols shown in Table III are substituted for example for 2,2-bis(3,5-dichloro-4-hydroxyphenyl)propane.

Additional suitable polyesters are obtained when equivalent amounts of the diacid chlorides of the dicarboxylic acids shown in Table IV are substituted, for example, for isophthaloyl chloride in the procedure of Example 1, Part A.

Additional suitable polyamides are obtained when equivalent amounts of the diamines shown in Table II are substituted for 4-isopropylmetaphenylenediamine in the procedure of Example 31, part A, and when equivalent amounts of the diacid chlorides of the dicarboxylic acids shown in Table IV are substituted for isophthaloyl chloride in the procedure of Example 31, Part A.

A preferred group of polyesters and polyamides are copolyesters and copolyamides formed by reacting a glycol or a diamine with an equivalent amount of a mixture of isophthaloyl and terephthaloyl chlorides where the molar and weight proportions of the acid chlorides may vary from 99/1 to 1/99 respectively. Particularly preferred are copolyesters and copolyamides in which isophthaloyl chloride is used in excess of terephthaloyl chloride, especially where the ratio is 70/30.

TABLE I

| Dianhydrides | $R^1$ |
|---|---|
| 1. Pyromellitic dianhydride | |
| 2. 3,4,3',4'-Diphenylsulfonetetracarboxylic dianhydride | |
| 3. 3,4,3',4'-Benzoplenonetetracarboxylic dianhydride | |
| 4. Pyrazinetetracarboxylic dianhydride | |
| 5. 3,4,3',4'-Diphenyldimethylmethanetetracarboxylic dianhydride | |
| 6. 3,4,3',4'-Diphenyldi(trifluoromethyl)methanetetracarboxylic dianhydride | |
| 7. 2,3,6,7-Naphthalenetetracarboxylic dianhydride | |
| 8. 3,4,3',4'-Diphenyltetracarboxylic dianhydride | |
| 9. 3,4,9,10-Perylenetetracarboxylic dianhydride | |
| 10. 3,4,3', 4'-Diphenylethertetracarboxylic dianhydride | |
| 11. 1,2,4,5-Naphthalenetetracarboxylic dianhydride | |
| 12. 1,4,5,8-Naphthalenetetracarboxylic dianhydride | |
| 13. 1,8,9,10-Phenanthrenetetracarboxylic dianhydride | |
| 14. 3,4,3',4'-Diphenylmethanetetracarboxylic dianhydride | |
| 15. 2,3,4,5-Thiophenetetracarboxylic dianhydride | |

Preferred dianhydrides are items 1, 6 and 10 of Table I.

TABLE II

| Diamine | R |
|---|---|
| 1. 4,4'-Diaminodiphenyl ether | |
| 2. 4,4'-Diaminodiphenyl sulfone | |

TABLE II-continued

| Diamine | R |
|---|---|
| 3. 4,4'-Diaminodiphenylbis-(trifluoromethyl)methane | 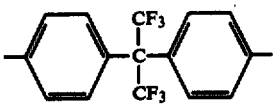 |
| 4. Lithium 2,4-diamino-benzene sulfonate | 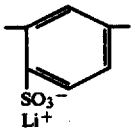 |
| 5. m-Phenylenediamine | 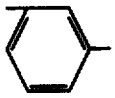 |
| 6. p-Phenylenediamine | 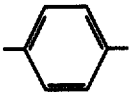 |
| 7. 4,4'-Diaminodiphenyl-propane | 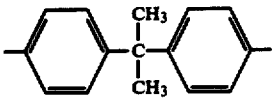 |
| 8. 2,4-Diaminotoluene | 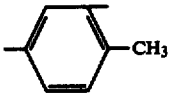 |
| 9. 4,4'- Diaminodiphenyl-methane | 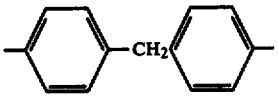 |
| 10. 4,4'-Diaminodiphenyl sulfide | 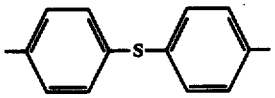 |
| 11. 2,6-Diaminopyridine | 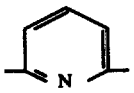 |
| 12. Bis(4-aminophenyl)-diethylsilane | 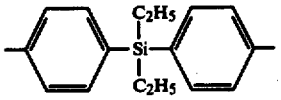 |
| 13. Bis(4-aminophenyl)-diphenylsilane | 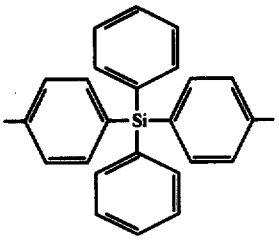 |
| 14. Benzidine | 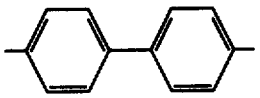 |
| 15. 3,3'-Dimethoxybenzidine | 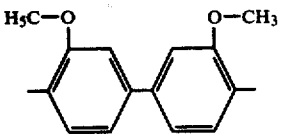 |
| 16. Bis(4-aminophenyl)-ethylphosphine oxide | 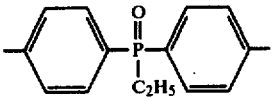 |

TABLE II-continued

| Diamine | R |
|---|---|
| 17. Bis(4-aminophenyl)-butylamine | 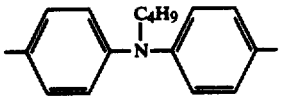 |
| 18. Bis(4-aminophenyl)-methylamine | 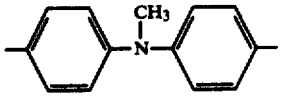 |
| 19. 1,5-Diaminonaphthalene | 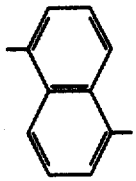 |
| 20. 3,3'-Dimethyl-4,4'-diaminobiphenyl | 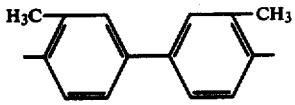 |
| 21. N-(3-aminophenyl)-4-aminobenzamide | 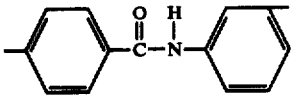 |
| 22. 4-Aminophenyl 3-amino-benzoate | 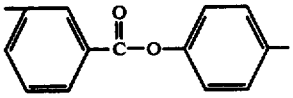 |
| 23. N,N-Bis(4-amino-phenyl)aniline | 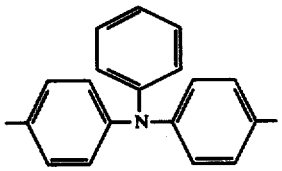 |
| 24. 2,6-Diaminotoluene | 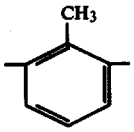 |
| 25. Calcium sulfometa-phenylenediamine | 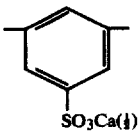 |
| 26. 4,6-Dichlorometa-phenylenediamine | 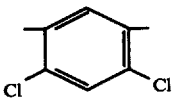 |
| 27. 2,4,6-Trichlorometa-phenylenediamine | 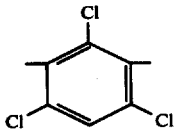 |
| 28. 4,4'-Diaminotriphenyl-methane | 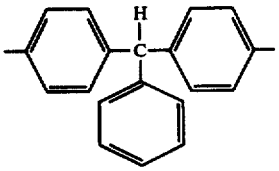 |

TABLE II-continued

| Diamine | R |
|---|---|
| 29. Bis(4-amino-2,5-diethoxyphenyl) phenylmethane | 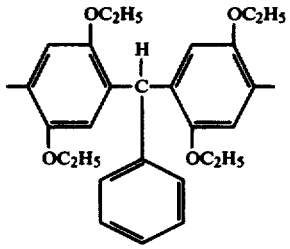 |
| 30. 4-Isopropylmetaphenylenediamine | 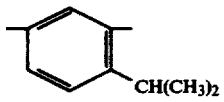 |
| 31. 2,5,2',5'-Tetrachlorobenzidine | 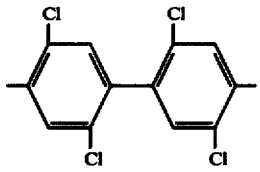 |
| 32. 2,6-Dichloro-p-phenylenediamine | 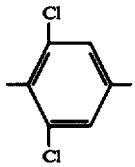 |
| 33. 3,3'-Dichlorobenzidine | 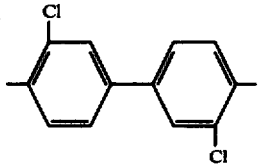 |
| 34. 2,2'-Diaminodiphenylmethane | 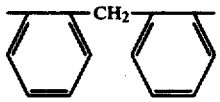 |
| 35. 2,2'-Diamino-3,5,6-trichlorodiphenylmethane | 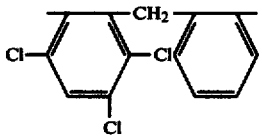 |
| 36. 2,2-Bis(4-aminophenyl)-1,3-diphenylpropane | 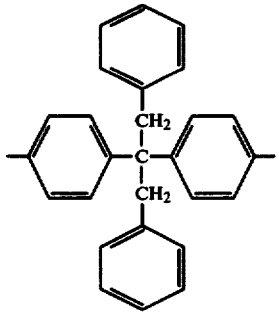 |

Preferred diamines are items 1–3, 5–10, 14, 15, 19, 20 and 30 of Table II.

TABLE III

| | Diols |
|---|---|
| 1 | 4,4'-Dihydroxydiphenyl ether |
| 2 | 4,4'-Dihydroxydiphenyl sulfone |
| 3 | 4,4'-Dihydroxydiphenylbis(trifluoromethyl)methane |
| 4 | Lithium 2,4-dihydroxybenzenesulfonate |
| 5 | Resorcinol |

TABLE III-continued

| | Diols |
|---|---|
| 6 | Hydroquinone |
| 7 | 2,2-Bis(4,4'-dihydroxydiphenyl)propane |
| 8 | 2,4-Dihydroxytoluene |
| 9 | 4,4'-Dihydroxydiphenylmethane |
| 10 | 4,4'-Dihydroxydiphenyl sulfide |
| 11 | 2,6-Dihydroxypyridine |
| 12 | Bis(4-hydroxyphenyl)diethylsilane |
| 13 | Bis(4-hydroxyphenylj)diphenylsilane |
| 14 | 4,4'-Dihydroxybiphenyl |
| 15 | 4,4'-Dihydroxy-3,3'-dimethoxybiphenyl |
| 16 | Bis(4-hydroxyphenyl)ethylphosphine oxide |
| 17 | Bis(4-hydroxyphenyl)butylamine |
| 18 | Bis(4-hydroxyphenyl)methylamine |
| 19 | 1,5-Dihydroxynaphthalene |
| 20 | 4,4'-Dihydroxy-3,3'-dimethylbiphenyl |
| 21 | N-(3-Hydroxyphenyl)-4-hydroxybenzamide |
| 22 | 4-Hydroxyphenyl 3-hydroxybenzoate |
| 23 | N,N-Bis(4-hydroxyphenyl)aniline |
| 24 | 2,2-Bis(3-chloro-4-hydroxyphenyl)propane |
| 25 | 2,2-Bis(3,5-dibromo-4-hydroxyphenyl)propane |
| 26 | Bis(4-hydroxyphenyl)isononylmethane |
| 27 | 2,2-Bis(3,5-diisopropyl-4-hydroxyphenyl)decane |
| 28 | 2,2-Bis(4-hydroxyphenyl)isopentane |
| 29 | 4,4-Bis(3,5-dichloro-4-hydroxyphenyl)heptane |
| 30 | 2,2-Bis(3,5-dibromo-4-hydroxyphenyl)decane |
| 31 | Bis(3,5-dibromo-4-hydroxyphenyl)ether |
| 32 | Bis(3-chloro-5-methyl-4-hydroxyphenyl)ether |
| 33 | 3,3'-Diethyl,4,4'-dihydroxydiphenyl |
| 34 | 3,5,3',5'-Tetrabromo-4,4'-dihydroxydiphenyl |
| 35 | Bis(3,5-dibromo-4-hydroxyphenyl)sulfone |
| 36 | Bis(3,5-diisopropyl-4-hydroxyphenyl)sulfone |
| 37 | 1,4-Dihydroxy-2,3-dichlorobenzene |
| 38 | 1,4-Dihydroxy-2-bromo-3-propylbenzene |
| 39 | 2,3-Bis(p-hydroxyphenyl)pentane |
| 40 | 2,2-Bis(3-methyl-5-t-butyl-4-hydroxyphenyl)propane |
| 41 | 2,2-Bis(4-hydroxyphenyl)-3-cyclohexylpropane |
| 42 | 2,4-Bis(p-hydroxyphenyl)heptane |
| 43 | 2,2-Bis(3-cyclohexyl-4-hydroxyphenyl)propane |
| 44 | Bis(3-t-Butyl-4-hydroxyphenyl)sulfone |
| 45 | 2,2-Bis(3-phenyl-4-hydroxyphenyl)propane |
| 46 | 1,1-Bis(4-hydroxyphenyl)-5-phenylpentane |
| 47 | Bis(2-hydroxyphenyl)methane |
| 48 | 2,2'-Dihydroxy-3,5,6trichlorodiphenylmethane |
| 49 | 2,2-Bis(4-hydroxyphenyl)-1,3-diphenylpropane |
| 50 | 2,2-Bis(3,5-dichloro-4-hydroxyphenyl)hexafluoropropane |

Preferred diols are items 1–3, 5–10, 19, 24, 25, 31 and 50 of Table III.

TABLE IV

| | Dicarboxylic Acids |
|---|---|
| 1 | Diphenyl ether 4,4'-dicarboxylic acid |
| 2 | Diphenyl sulfone 4,4'-dicarboxylic acid |
| 3 | Diphenylbis(trifluoromethyl)methane-4,4'-dicarboxylic acid |
| 4 | Isophthalic acid |
| 5 | Terephthalic acid |
| 6 | 4,4'-Propylidenedibenzoic acid |
| 7 | 4-Methylisophthalic acid |
| 8 | 4,4'-Methylenedibenzoic acid |
| 9 | Diphenyl sulfide 4,4'-dicarboxylic acid |
| 10 | 2,6-Pyridinedicarboxylic acid |
| 11 | 4,4'-Diethylsilanedibenzoic acid |
| 12 | 4,4'-Diphenylsilanedibenzoic acid |
| 13 | 4,4'-Bisbenzoic acid |
| 14 | 4,4'-Bisanisic acid |
| 15 | Bis(4-carboxyphenyl)ethylphosphine oxide |
| 16 | 1,5-Naphthalenedicarboxylic acid |
| 17 | 4,4'-Bis(o-toluic) acid |
| 18 | 4-Bromoisophthalic acid |

Preferred dicarboxylic acids are items 1–6, 13 and 16 of Table IV.

SPECIFIC EMBODIMENTS OF THE INVENTION

In the illustrative examples which follow, parts and percentages are by weight unless otherwise specified.

EXAMPLE 1

Part A

Polyester from isophthaloyl chloride and 2,2-bis(3,5-dichloro-4-hydroxyphenyl)propane.

A mixture of 183 g of 2,2-bis(3,5-dichloro-4-hydroxyphenyl)propane, 1 liter of s-tetrachloroethane, 0.72 g of $AlCl_3$ and 101.6 of isophthaloyl chloride was heated and stirred under nitrogen at reflux for 1 hour. The resulting viscous polyester solution was allowed to cool and 1 ml of water was added with vigorous stirring. The resulting solution contained about 17% polyester. The polyester was precipitated in hexane with vigorous agitation, filtered and dried.

The repeating unit of the polyester prepared as above was checked against requirements (a), (b), and (c) as follows:

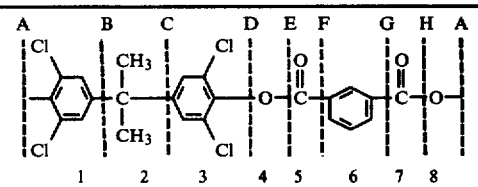

| Rigid Subunit | Colinearity | Restricted Bonds |
|---|---|---|
| 1 | L | A |
| 2 | N | — |
| 3 | L | D |
| 4 | N | D |
| 5 | N | — |
| 6 | N | — |
| 7 | N | — |
| 8 | N | A |

The repeating unit has 2 L and 6 N rigid subunits, 2 bonds with restricted rotation, 2 of the N subunits have at least one bond with restricted rotation, and18/23 (78%) of the atoms in the chain are aromatic. This polymer thus satisfies the requirements set out above.

Part B

The polyester of Part A was dissolved in tetrachloroethane in an amount to give a 16% solution. The solution was filtered through a 5.0μ silver membrane. The filtrate was degassed to remove bubbles. The filtrate was cast on a glass plate which had been coated with a low molecular weight polytetrafluoroethylene wax dispersion (Vydax®) and heated to 110° C. A 15 mil doctor knife was used to spread the solution. The film was then covered to protect the solution or the partially dried tacky film from dust. The cover was equipped with vents. After allowing the film to dry for 5 minutes at 110° C. vents in the cover were opened and the film was allowed to dry another 10 minutes. The 1.5 mil film was then stripped from the glass plate and tested as a permeation membrane for a mixture of oxygen and nitrogen using the apparatus of the Figure. The film permeated $O_2$ at 140 GTR and 126 cB. The film permeated nitrogen at 25 GTR and 22 cB. The selectivity, $S_{O_2/N_2}$, was 5.6.

EXAMPLE 2

The procedure of Example 1, Part B was repeated using a 15 mil doctor knife. The film was covered and dried at 100° C. for 5 minutes after which vents were opened and drying continued for 10 minutes. The clear, bluish, smooth, crisp, 2.4 mil film was stripped from the plate and tested for oxygen and nitrogen permeability. The film permeated $O_2$ at 115 GTR and 166 cB and $N_2$ at 21 GTR and 30 cB. The $S_{O_2/N_2}$ was 5.5.

EXAMPLE 3

The procedure of Example 1, Part B was repeated, using a 10 mil knife in place of the 15 mil knife and under otherwise similar conditions except that the plate was allowed to cool at room temperature for 15 min before stripping the film. A film of 1.35 mil thickness was obtained. It permeated $O_2$ at 221 GTR and 179 cB and $N_2$ at 40 GTR and 32 cB. $S_{O_2/N_2}$ was 5.5.

EXAMPLE 4

The procedure of Example 1, Part B was repeated four times with the exception that casting and drying temperatures of 50°, 55°, 60° and 70° C. were used respectively in place of 110° C.

The 1.5 mil film prepared at 50° C. permeated $H_2$ at 1774 GTR and 1597 cB and $CH_4$ at 58 GTR and 52 cB. The $S_{H_2/CH_4}$ was 31.

The 1.45 mil film prepared at 55° C. permeated $H_2$ at 1815 GTR and 1579 cB and $CH_4$ at 68 GTR and 59 cB. The $S_{H_2/CH_4}$ was 27.

The 1.5 mil film prepared at 60° C. permeated $H_2$ at 1683 GTR and 1515 cB and $CH_4$ at 63 GTR and 57 cB. The $S_{H_2/CH_4}$ was 27.

The 1.5 mil film prepared at 70° C. permeated $H_2$ at 1795 GTR and 1616 cB and $CH_4$ at 64 GTR and 58 cB. The $S_{H_2/CH_4}$ was 28.

EXAMPLE 5

The Example of Exampale 1, Part A, 8 g, and 3.2 g of a mixture of N-ethyl-ortho- and -paratoluenesulfonamides (Santicizer 8, Monsanto Co.) were dissolved in 72 g tetrachloroethane. The solution was filtered through a 0.45μ silver membrane, degassed, and cast on a Vydax®-coated glass plate at 60° C. with a 15 mil knife. The film was covered and dried for 5 minutes with the vents closed and 10 minutes with the vents open. The film was allowed to cool and stripped from the glass plate. The 1.2 mil film permeated $H_2$ at 569 GTR and 410 cB, and $CH_4$ at 18 GTR and 13 cB. The $S_{H_2/CH_4}$ was 32.

EXAMPLE 6

Part A

The polyamide from m-phenylenediamine and a 70/30 mixture of isophthalic and terephthalic acid chlorides was prepared using the procedure shown by Richter and Hoehn in U.S. Pat. No. 3,567,632, col. 28, line 61 to col. 29, line 12. This polyamide is referred to as MPD-I/T (100-70/30).

Part B

This example concerns a semipermeable membrane made from a blend of a polyester which satisfies requirements (a), (b), and (c) with a polyamide. A casting solution was prepared using 10 parts of a solution containing 15 wt % MPD-I/T (100-70/30) in tetrahydrofuran, 10 parts of a solution containing 15 wt % of the polyester of Example 1, Part A, in dimethylacetamide, and 1.2 parts Santicizer 8. This solution was cast on a Vydax ® coated glass plate at room temperature with a 15 mil knife. The file was dried for 15 min at 110° C. The 1.55 mil film permeated $H_2$ at 572 GTR and 532 cB, and $CH_4$ at 6 GTR and 6 cB. The $S_{H_2/CH_4}$ was 95.

EXAMPLE 7

Part A

Polyamide from metaphenylenediamine and isophthaloyl chloride.

Under nitrogen a solution of 2.36 moles of metaphenylenediamine in 32 moles of N,N-dimethylacetamide was stirred and cooled at −10° to 0° C. and 2.36 moles of molten isophthaloyl chloride was added in small portions. During the addition the temperature was allowed to rise to 20° C. The reaction was completed by heating the resulting viscous solution to about 50° C. The solution was diluted to 9% polyamide by adding dimethylacetamide. The polymer was isolated from this solution by drowning in crushed ice and ice water under vigorous agitation. The polymer was recovered by filtration, washed with water and dried under vacuum at 80° C.

Part B

A solution of 3 g of the polyester of Example 1, Part A, in 17 g of tetrahydrofuran was mixed with a solution of 3 g polymetaphenylene isophthalamide (prepared as in Part A) in 17 g of dimethylacetamide.

The combined solution was filtered through a 0.8μ silver membrane. The filtrate was cast on a Vydax ® coated glass plate at room temperature in a dust-free cabinet with a 15 mil doctor knife. The film was allowed to dry for 15 min at room temperature in the dust-free cabinet and was then transferred to a hot plate maintained at 110° C. and allowed to dry for 5 min. The film was stripped, air dried, and then dried in a vacuum at room temperature. The 1.15 mil film permeated $H_2$ at 689 GTR and 475 cB and $CH_4$ at 111 GTR and 77 cB. The $S_{H_2/CH_4}$ was 6.2.

EXAMPLE 8

The procedure of Example 6, Part B was repeated except that the plasticizer (Santicizer 8) was omitted. The 2 mil film containing polyamide and polyester in the ratio 50/50 permeated $H_2$ at 867 GTR and 1040 cB and $CH_4$ at 13 GTR and 16 cB. The $S_{H_2/CH_4}$ was 67.

EXAMPLE 9

Part A

Polyester from isophthaloyl chloride and 2,2-bis(3,5-dichloro-4-hydroxyphenyl)hexafluoropropane.

The procedure of Example 1, Part A was repeated except that the 2,2-bis(3,5-dichloro-4-hydroxyphenyl) propane was replaced by a chemically equivalent amount of 2,2-bis(3,5-dichloro-4-hydroxyphenyl)hexafluoropropane. The polymer was isolated as before.

The polyester prepared as above was checked against requirements (a), (b) and (c) as follows:

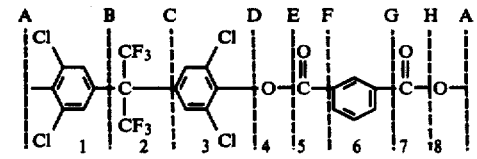

| Rigid Subunit | Colinearity | Restricted Bonds |
|---|---|---|
| 1 | L | A, B |
| 2 | N | B, C |
| 3 | L | C, D |
| 4 | N | D |
| 5 | N | — |
| 6 | N | — |
| 7 | N | — |
| 8 | N | A |

The repeating unit has 6 N and 2 L subunits, 4 bonds with restricted rotation, 3 of the N subunits have at least one bond with restricted rotation, and 18/23 of the chain atoms are aromatic.

Part B

A solution was prepared from 5.4 g of the polyester of Part A and 30.6 g of chloroform. The solution was filtered through a 0.45μ silver membrane, degassed and cast on a Vydax ® coated glass plate at room temperature in a dust-free cabinet using a 15 mil doctor knife. The film was allowed to dry for 15 minutes at room temperature, stripped, and dried in a vacuum at room temperature. The crystal-clear, smooth, crisp, 1.8 mil film permeated $H_2$ at 5687 GTR and 6142 cB and $CH_4$ at 126 GTR and 136 cB. The $S_{H_2/CH_4}$ was 45.

Part C

To the solution described in Part B was added sufficient diethylphthalate to give an amount of plasticizer equal to 40% by weight based on the polymer. This solution was then cast on a Vydax ® coated glass plate at room temperature in a dust-free cabinet with a 15 mil doctor knife. The film was allowed to dry at room temperature in a dust-free cabinet for 15 minutes, stripped and dried in a vacuum at room temperature. The crystal-clear, smooth, soft, 1.9 mil film permeated $H_2$ at 1886 GTR and 2150 cB and $CH_4$ at 338 GTR and 385 cB. The $S_{H_2/CH_4}$ was 5.6.

EXAMPLE 10

Part A

Polyester from a 1:1 mixture of isophthaloyl chloride and terephthaloyl chloride and 2,2-bis(4-hydroxyphenyl)hexafluoropropane.

The procedure of Example 9, Part A was repeated except that half of the isophthaloyl chloride was replaced with terephthaloyl chloride. The polymer was isolated as before.

The polyester prepared as above was checked against requirements (a), (b) and (c) as follows:

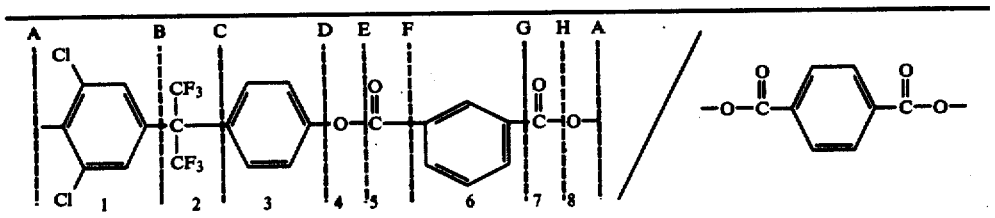

(I) (T)

| Rigid Subunit | Colinearity | Restricted Bonds |
|---|---|---|
| 1 | L | B |
| 2 | N | B, C |
| 3 | L | C |
| 4 | N | — |
| 5 | N | — |
| 6 | N (I)<br>L (T) | — |
| 7 | N | — |
| 8 | N | — |

The repeating unit (I) has 2 L and 6 N subunits. The repeating unit (T) has 3 L and 5 N subunits. In both (I) and (T) there are 2 restricted bonds and one of the N subunits has two bonds with restricted rotation. In both (I) and (T) 18/23 of the chain atoms are aromatic.

Part B

A solution prepared from 6 g of the polyester shown in Part A and 34 g of chloroform was filtered through a 0.45μ silver membrane, degassed and cast on a Vydax® coated glass plate using a 15 mil doctor knife at room temperature in a dust-free box. The film was allowed to dry for 15 min at room temperature and was then stripped. The clear, 1.6 mil film permeated $H_2$ at 2627 GTR and 2522 cB and $CH_4$ at 70 GTR and 67 cB. The $S_{H_2/CH_4}$ was 38.

EXAMPLE 11

A solution prepared from 6 g of the polyester of Example 10, Part A and 54 g of tetrachloroethane was filtered through a 0.45μ silver membrane and degassed. The solution was cast on Vydax® coated glass plate at 100° C. using a 25 mil doctor knife, covered and dried for 5 min. The vents in the cover were then opened and drying continued for 10 min. The clear, crisp, 1.7 mil film obtained on stripping permeated $H_2$ at 2071 GTR and 2112 cB and $CH_4$ at 52 GTR and 53 cB. The $S_{H_2/CH_4}$ was 40.

EXAMPLE 12

The procedure of Example 11 was repeated except that a 15 mil knife was used in place of a 25 mil knife. The smooth, clear 1.0 mil film permeated $H_2$ at 2772 GTR and 1663 cB and $CH_4$ at 92 GTR and 55 cB. The $S_{H_2/CH_4}$ was 30.

EXAMPLE 30

Part A

Polyimide from pyromellitic dianhydride and 4-isopropyl-1,3-diaminobenzene.

To a solution of 15 g of 4-isopropyl-1,3-diaminobenzene in 190 ml of dry N,N-dimethylacetamide under nitrogen was added with stirring 21.8 g of pyromellitic dianhydride, rinsed in with an additional 68 ml of dimethylacetamide. After 30 minutes of stirring 30.63 g of acetic anhydride and 30.36 g of triethylamine were added. The resulting solution was stirred 1 hour at room temperature and then 1 hour at 50° C. The polyimide was precipitated by drowning in excess methanol under vigorous agitation, recovered by filtration, washed with methanol and dried under vacuum.

The polyimide prepared as shown above was checked against requirements (a), (b) and (c) as follows:

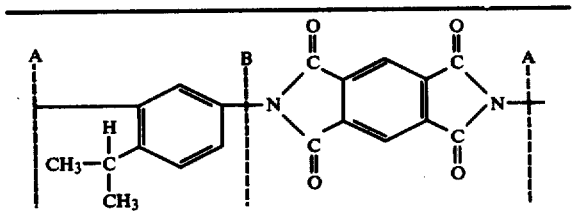

| 1<br>Rigid Subunit | Colinearity | 2<br>Restricted Bonds |
|---|---|---|
| 1 | N | A |
| 2 | L | A |

The repeating unit has 1 L and 1 N subunit, one bond with restricted rotation and 12/18 chain atoms are aromatic.

Part B

A solution of 3 g of the polyimide of Part A in 17 g of dimethylacetamide was filtered through a 0.45μ silver membrane, degassed, and cast on a Vydax® coated glass plate at 100° C. with a 15 mil doctor knife. The film was covered and allowed to dry for 5 min after which the vents in the cover were opened and drying was continued for 10 min. The clear, brown, 0.75 mil film obtained on stripping permeated hydrogen at 24,263 GTR and 10,918 cB and $CH_4$ at 977 GTR and 440 cB. The $S_{H_2/CH_4}$ was 25.

EXAMPLE 14

Part A

A solution of 15 g of the polyimide of Example 13, Part A, 0.75 g of lithium nitrate and 85 g of dimethylacetamide was filtered through 0.45μ silver membrane, degassed, and cast on an Inconel plate at 110° C. with a 15 mil knife and dried for 5 min. The Inconel plate was then taken from the hot plate directly into a bath of methanol, cooled to 0° C., and allowed to remain there for 30 min. The 1.05 mil film was stripped from the plate and allowed to air dry. The film permeated $H_2$ at 46,664 GTR and $CH_4$ at 2,662 GTR. The $S_{H_2/CH_4}$ was 18.

Part B

Another portion of the solution from Part A was cast on Inconel at 110° C. with a 30 mil doctor knife and dried for 5 min. The plate was then removed from the hot casting stage, placed in methanol at 0° C. and allowed to remain in the bath for 30 min. The film was then stripped and air dried. The clear, yellow, crisp 2.5 mil film permeated $H_2$ at 17,302 GTR and $CH_4$ at 1,012 GTR. The $S_{H_2/CH_4}$ was 17.

EXAMPLE 15

Part A

Polyimide from 3,4,3',4'-diphenylhexafluoroisopropylidene tetracarboxylic dianhydride and 1,5-diaminonaphthalene.

To a solution of 31.64 g of 1,5-diaminonaphthalene in 350 ml of N,N-dimethylacetamide under nitrogen was added 88.87 g of 3,4,3',4'-diphenylhexafluoroisopropylidene tetracarboxylic dianhydride. The mixture was heated to 69° C. and stirred for 1 hour. Then a mixture of 82 g of acetic anhydride and 82 g of [triethylamide] *triethylamine* was added in small portions over a period of about 10 minutes, starting with the solution at 53° C. Within a few minutes of stirring a peak temperature of 60.5° C. was reached. Stirring *was* continued for one hour as the temperature gradually dropped. The resulting solution ws drowned in a large excess of methanol under vigorous agitation. The precipitated polyimide was recovered by filtration, washed with methanol and dried under vacuum, first at room temperature for about 16 hours and then for 3 hours at 260° C.

The polyimide prepared as shown above was checked against requirements (a), (b) and (c) as follows:

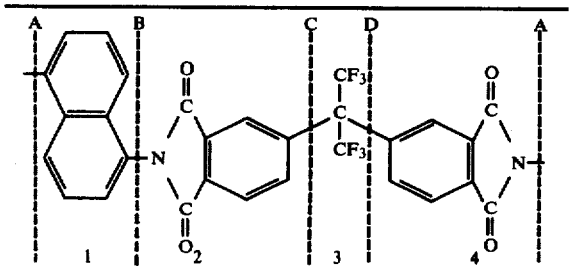

| Rigid Subunit | Colinearity | Restricted Bonds |
|---|---|---|
| 1 | N | A, B |
| 2 | N | B, C |
| 3 | N | C, D |
| 4 | N | D, A |

The repeating unit contains 4 N subunits, 4 bonds with restricted rotation, all of the N subunits have at least one bond having restricted rotation, and 22/29 of the chain atoms are aromatic.

Part B

A solution of 20 g of the polyimide of Part A in 80 g of dimethylacetamide was filtered through a 0.8μ silver membrane, degassed, cast on a Vydax® coated glass plate at 100° C. using a 25 mil doctor knife. The film was covered, dried at 100° C. for 5 min. with the cover vents closed and 10 min. with the vents open. The film was then stripped. The clear 2.67 mil film permeated $H_2$ at 2912 GTR and 4,665 cB and $CH_4$ at 75 GTR and 120 cB. The $S_{H_2/CH_4}$ was 39.

EXAMPLE 16

Part A

Polyimide from 3,4,3',4'-diphenylhexafluoroisopropylidene tetracarboxylic dianhydride and 4,4'-diaminodiphenyl ether.

To a solution of 40.05 g of 4,4'-diaminodiphenyl ether in 350 ml of dry pyridine under nitrogen at 50° C. was added 88.87 g of 3,4,3',4'-diphenylhexafluoroisopropylidene tetracarboxylic dianhydride. The temperature rose to a peak of 74° C. within a few minutes. After one hour of stirring 82 g of acetic anhydride was added. The temperature rose to a peak of 66° C. within a few minutes. Stirring was continued for 3 hours, during the latter portion of which the solution was heated to 100° C. After cooling the solution to room temperature the polyimide was precipitated by drowning in a large excess of methanol under vigorous agitation, recovered by filtration, washed with methanol and dried under vacuum, first for 4 hours at 170° C. and then for 3 hours at 260° C.

The polyimide prepared as shown above was checked against requirements (a), (b) and (c) as follows:

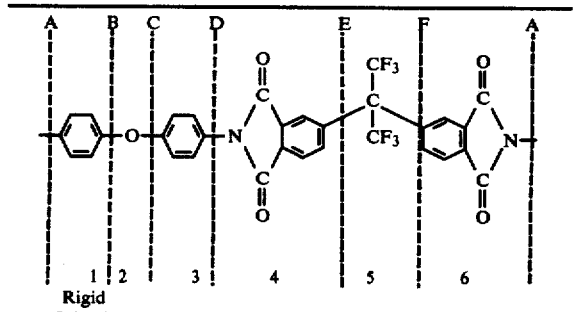

| Rigid Subunit | Colinearity | Restricted Bonds |
|---|---|---|
| 1 | L | — |
| 2 | N | — |
| 3 | L | — |
| 4 | N | E |
| 5 | N | E, F |
| 6 | N | F |

The repeating unit has 4 N and 2 L subunits, 2 bonds with restricted rotation, 3 of the N subunits have at least one bond with restricted rotation, 24/32 of the atoms in the chain are aromatic.

Part B

A solution of 30 g of the polyimide of Part A and 170 g of dichloromethane was filtered through a 0.45μ silver membrane, degassed and cast on a Vydax® coated Inconel sheet at room temperature in a dust-free cabinet with a 15 mil doctor knife. The solution was dried for 15 min and the film stripped. The clear, yellow film, 1.42 mils thick, permeated $H_2$ at 3197 GTR and 2724 cB and $CH_4$ at 106 GTR and 90 cB. The $S_{H_2/CH_4}$ was 30.

EXAMPLE 17

A solution of 20 g of the polyimide of Example 16, Part A in 80 g of dimethylacetamide was filtered through a 0.8μ silver membrane, degassed, and cast on a Vydax® coated glass plate at 100° C. with a 25 mil doctor knife. The film was covered, dried at 100° C. for 5 min after which the vents on the cover were opened and drying continued 10 min. The clear, crisp 2.60 mil film permeated $H_2$ at 1378 GTR and 2150 cB and $CH_4$ at 47 GTR and 73 cB. The $S_{H_2/CH_4}$ was 29.

EXAMPLE 18

Part A

Polyimide from 3,4,3',4'-diphenylhexafluoroisopropylidene tetracarboxylic dianhydride and 4-isopropyl-1,3-diaminobenzene.

To a solution of 31.21 g of 4-isopropyl-1,3-diaminobenzene in 350 ml of dry pyridine under nitrogen at 50° C. was added with stirring 92.29 g of 3,4,3',4'-diphenylhexafluoroisopropylidene tetracarboxylic dianhydride, rinsed in with an added 50 ml of pyridine. Within a few minutes the temperature rose to a peak of 76° C. After stirring for about two hours the temperature was 52° C. and 85.2 g of acetic anhydride was added. Within a few minutes the temperature rose to a peak of 66° C. After one hour of stirring the solution was heated to 99° C. and stirred for about 20 minutes. The polyimide was precipitated from the cooled solution by drowning it in a large excess of methanol under vigorous agitation. The polyimide was recovered by filtration, washed 3 times with methanol and dried under vacuum, first for 4 hours at 100° C. and then for 4 hours at 260° C.

The polyimide prepared as shown above was checked against requirements (a), (b) and (c) as follows:

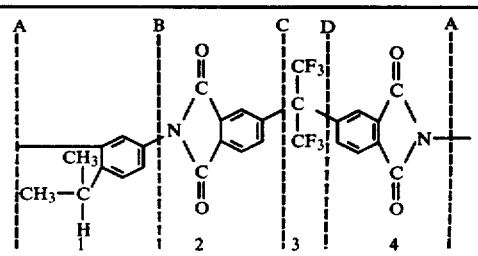

| Rigid Subunit | Colinearity | Restricted Bonds |
|---|---|---|
| 1 | N | A |
| 2 | N | C |
| 3 | N | C, D |
| 4 | N | D, A |

The repeating unit has 4 N subunits, 3 restricted bonds, all of the N subunits have at least one bond with restricted rotation, 18/25 of the chain atoms are aromatic.

Part B

A solution of 85 g of the polymide of Part A in 340 g of dimethylacetamide was filtered through a 0.45μ silver membrane, degassed and cast on a Vydax® coated glass plate at 100° C. using a 15 mil doctor knife. The film was *then* covered and allowed to dry for 5 min after which the vents in the cover were opened and film allowed to dry another 10 min. The 1.79 mil film permeated $H_2$ at 11,150 GTR and 11,975 cB and $CH_4$ at 851 GTR and 914 cB. The $S_{H_2/CH_4}$ was 13.

EXAMPLE 19

Part A

Polyimide from 3,4,3',4'-diphenylhexafluoroisopropylidene tetracarboxylic dianhydride and metaphenylenediamine.

To a solution of 10.81 g of metaphenylenediamine in 175 ml of dry N,N-dimethylacetamide under nitrogen at 50° C. was added with stirring 44.43 g of 3,4,3',4'-diphenylhexafluoroisopropylidene tetracarboxylic dianhydride, rinsed in with an added 25 ml of dimethylacetamide. Within two minutes the temperature rose to a peak of 66° C. Stirring was continued for more than an hour. With the solution at 45° C. a mixture of 82 g of triethylamine and 82 g of acetic anhydride was stirred in. Within 10 minutes, the temperature rose to a peak of 52° C. and then began to drop. Stirring was continued for about 2 hours. The resulting polyimide solution in dimethylacetamide was concentrated to 32% by evaporation, diluted to 10% by adding 359 g additional dimethylacetamide and then concentrated to about 15% polyimide by evaporation and used without further treatment.

The polyimide prepared as shown above was checked against requirements (a), (b) and (c) as follows:

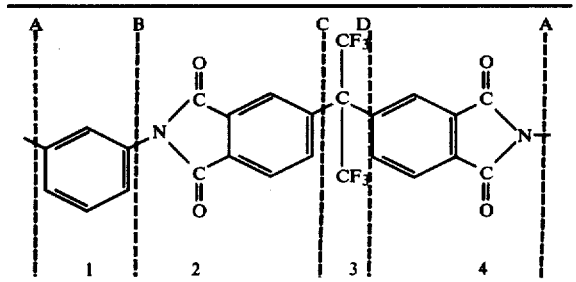

| Rigid Subunit | Colinearity | Restricted Bonds |
|---|---|---|
| 1 | N | — |
| 2 | N | C |
| 3 | N | C,D |
| 4 | N | D |

Repeating unit has 4 N subunits, 2 bonds with restricted rotation, 3 of the N subunits have at least one bond with restricted rotation, and 18/25 of the atoms in the chain are aromatic.

Part B

The 15% solution of the polyimide in dimethylacetamide from Part A was filtered, degassed, and cast on a Vydax® coated glass plate at 100° 1 C. with a 25 mil doctor knife. The film was covered and allowed to dry for 5 minutes at 100° C. The vents in the cover were then opened and drying was continued for 10 minutes. The clear, crisp 1.61 mil film permeated $H_2$ at 3054 GTR and 2950 cB and $CH_4$ at 70 GTR and 68 cB. The $S_{H_2/CH_4}$ was 44.

EXAMPLE 20

Part A

Polyimide from 3,4,3',4'-diphenylhexafluoroisopropylidene tetracarboxylic dianhydride and paraphenylenediamine.

To a solution of 21.63 g of paraphenylenediamine in 350 ml of N,N-dimethylacetamide at 50° C. under nitrogen was added with stirring 88.87 g of 3,4,3',4'-diphenylhexafluoroisopropylidene tetracarboxylic dianhydride, rinsed in with an additional 25 ml of dimethylacetamide. Within 5 minutes the temperature rose to a peak of 77° C. Stirring was continued for about 1 hour, at which time 82 g of triethylamine and 82 g of acetic anhydride were added. Stirring was continued for about 2 hours. The polyimide was precipitated by drowning the solution in a large excess of methanol under vigorous agitation. The polyimide was recovered by filtration, washed twice with methanol and dried under vacuum, first for 16 hours at room temperature and then for 3 hours at 260° C.

The polyimide prepared as shown above was checked against requirements (a), (b) and (c) as follows:

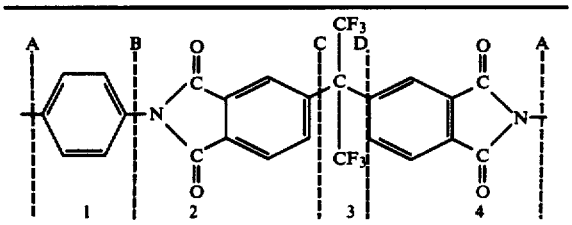

| Rigid Subunit | Colinearity | Restricted Bonds |
|---|---|---|
| 1 | L | — |
| 2 | N | C |
| 3 | N | C,D |
| 4 | N | D |

Repeating unit has 1 L and 3 N subunits, 2 restricted bonds, all of the N subunits have at least one bond with restricted rotation, and 18/25 of the atoms in the chain are aromatic.

Part B

A solution of 45 g of a polyimide like the one in Part A in 255 g of dimethylacetamide was filtered through a 0.45μ silver membrane, degassed, and cast on Vydax® coated glass plate at 100° C. with a 25 mil doctor knife. The film was covered and dried for 5 min. The vents in the cover were then opened and drying continued for 10 min. The smooth, clear, 1.3 mil film permeated $H_2$ at 3680 GTR and 2870 cB and $CH_4$ at 66 GTR and 51 cB. The $S_{H_2/CH_4}$ was 56.

EXAMPLE 21

Part A

Polyimide from 3,4,3',4'-diphenylhexafluoroisopropylidene tetracarboxylic dianhydride and the bisamide from metaphenylenediamine and metaaminobenzoic acid.

To a solution of 34.64 g of N,N'-metaphenylenebis(m-aminobenzamide) in 175 ml of dry N,N-dimethylacetamide under nitrogen at 50° C. was added with stirring 44.44 g of 3,4,3',4'-diphenylhexafluoroisopropylidene tetracarboxylic dianhydride, rinsed in with an added 25 ml of dimethylacetamide. Within a few minutes the temperature peaked at 76.5° C. and began to drop. After stirring for about 1 hour 41 g of triethylamine and 41 g of acetic anhydride were added. The temperature soon peaked at 66° C. and began to drop. After stirring for 2 hours, the polyimide was precipitated by drowning the solution in excess methanol under vigorous agitation. The polyimide was recovered by filtration, washed twice with methanol and dried under vacuum, first for about 18 hours at room temperature and then for 3 hours at 260° C.

The polyimide prepared as shown above was checked against requirements (a), (b) and (c) as follows:

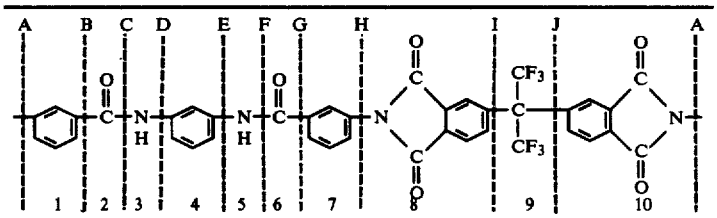

| Rigid Subunit | Colinearity | Restricted Bonds |
|---|---|---|
| 1 | N | — |
| 2 | N | — |
| 3 | N | — |
| 4 | N | — |
| 5 | N | — |
| 6 | N | — |
| 7 | N | — |
| 8 | N | I |
| 9 | N | I,J |
| 10 | N | J |

The repeating unit has 10 N subunits, 2 bonds with restricted rotation, 3 of the N subunits have at least one bond with restricted rotation, and 30/41 of the atoms in the chain are aromatic.

Part B

A solution of 12 g of the polyimide of Part A in 68 g of dimethylacetamide was filtered through 0.45μ silver membrane, degassed, and cast on a Vydax® coated glass plate at 100° C. with a 25 mil doctor knife. The film was covered and dried for 5 min. THe vents in the cover were then opened and drying continued for 10 min. The clear, smooth, crisp 1.62 mil film permeated $H_2$ at 1268 GTR and 1232 cB and $CH_4$ at 24 GTR and 23 cB. The $S_{H_2/CH_4}$ was 53.

EXAMPLE 22

A solution of 9 g of the polyester of Example 9, Part A, and 51 g of dimethylacetamide was filtered through a 0.45μ silver membrane, degassed and cast on a Vydax® coated glass plate at 100° C. with a 25 mil doctor knife. The film was covered, dried at 100° C. for 5 min. with the cover vents closed, and for 10 minutes with the cover vents open. The film was stripped and tested without further treatment. The clear, crisp 1.7 mil film permeated oxygen at 922 GTR and 940 cB and nitrogen at 106 GTR and 108 cB. The $S_{O_2/N_4}$ was 8.7.

EXAMPLE 23

Part A

Polyimide from 3,4,3',4'-diphenylhexafluoroisopropylidene tetracarboxylic dianhydride and 3,5-diaminobenzoic acid.

To a solution of 15.22 g of 3,5-diaminobenzoic acid in 175 ml of dry N,N-dimethylacetamide under nitrogen at 50° C. was added with stirring 44.44 g of 3,4,3',4'-diphenylhexafluoroisopropylidene tetracarboxylic dianhydride, rinsed in with an added 25 ml of dimethylacetamide. Within 2 minutes the temperature peaked at 74.5° C. and began to drop. After about 1 hour of stirring, 82 g of triethylamine and 82 g of acetic anhydride were added. Within 14 minutes the temperature peaked at 56° C. and began to drop. After stirring for 2 hours the solution was concentrated to 25% polyimide in dimethylacetamide by evaporation under vacuum first at 50° C. and then at 100° C. It was then diluted to 10% polyimide by adding 332 g of dimethylacetamide, followed by concentrating to 15% polyimide by evaporation and filtering through a 0.45μ silver membrane.

The polyimide prepared as shown above was checked against requirements (a), (b) and (c) as follows:

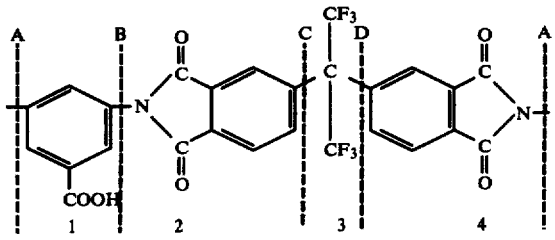

| Rigid Subunit | Colinearity | Restricted Bonds |
|---|---|---|
| 1 | N | — |
| 2 | N | C |
| 3 | N | C,D |
| 4 | N | D |

The repeating unit has 4 N subunits, 2 bonds with restricted rotation, 3 of the N subunits have at least one bond with restricted rotation, and 18/27 of the atoms in the chain are aromatic.

Part B

To 20 g of the polyimide solution from Part A was added 0.17 g ethylene glycol. The solution obtained was degassed and cast on a Vydax® coated glass plate at 100° C. with a 25 mil doctor knife. The film was covered, dried for 5 min, after which the vents in the cover were opened and drying was continued for 10 minutes. The clear, smooth, crisp, 1.31 mil film permeated $H_2$ at 2684 GTR and 2110 cB and $CH_4$ at 29 GTR and 23 cB. The $S_{H_2/CH_4}$ was 93.

EXAMPLE 24

Part A

Polyimide from 3,4,3',4'-diphenylhexafluoroisopropylidene tetracarboxylic dianhydride and 3,3'-diaminobenzanilide.

To a solution of 15.05 g of 3,3'-diaminobenzanilide in 120 ml of N,N-dimethylacetamide under nitrogen at 50° C. was added with stirring 29.68 g of 3,4,3',4'-diphenylhexafluoroisopropylidene tetracarboxylic dianhydride. Within a few minutes the temperature peaked at 55° C. After about an hour of stirring, 55 g of triethylamine and 55 g of acetic anhydride were added. After stirring for about an hour and a half the polyimide was precipitated by drowning in a large excess of methanol under vigorous agitation. The polyimide was recovered by filtration, washed twice with methanol and dried under vacuum, first for about 16 hours at room temperature and then for 3 hours at 260° C. At 0.1% concentration in dimethylacetamide at 25° C. the polyimide had an inherent viscosity of 1.15.

The polyimide-amide prepared as shown above was checked against requirements (a), (b) and (c) as follows:

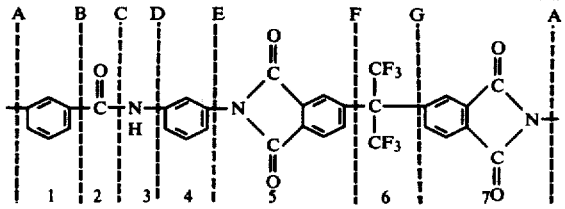

| Rigid Subunit | Colinearity | Restricted Bonds |
|---|---|---|
| 1 | N | — |
| 2 | N | — |
| 3 | N | — |
| 4 | N | — |
| 5 | N | F |
| 6 | N | F, G |
| 7 | N | G |

The repeating unit has 7 N subunits, 2 bonds with restricted rotation, 3 of the N subunits have at least one bond with restricted rotation, and 24/33 of the atoms in the chain are aromatic.

Part B

A solution of 15 g of the polyimide-amide of Part A in 85 g of dimethylacetamide was filtered through a 0.45μ silver membrane, degassed, and cast on a Vydax® coated glass plate at 100° C. with a 25 mil doctor knife. The film was covered, dried for 5 min, after which the vents in the cover were opened and drying was continued for 10 minutes. The 1.56 mil film permeated $H_2$ at 1328 GTR and 1243 cB and $CH_4$ at 16 GTR and 15 cB. The $S_{H_2/CH_4}$ was 83.

EXAMPLE 25

Part A

A series of five polymers and copolymers were prepared, the first by repeating the procedure of Example 15, Part A. The second, third, fourth and fifth were prepared by the same procedure except that 25%, 50%, 75% and 100% respectively of the 1,5-diaminonaphthalene (1,5-ND) was replaced by a molecular equivalent amount of 4,4'-diaminodiphenyl ether (ODA).

Part B

Films were prepared from the five polyimides of Part A by preparing 20% solutions in dimethylacetamide and casting on a Vydax® coated glass plate at 100° C. with a 25 mil doctor knife. The films were covered and dried for 5 min after which the vents on the cover were opened and drying was continued for 10 min. The films were then stripped from the plate and placed in a vacuum chamber and heat treated at 260° C. for 6 hrs under a vacuum of 2μ. The films were then tested for permeation of hydrogen and methane as shown in Table V.

TABLE V

| Mole % | | Thickness | $H_2$ Permeation | | Permeation | | Selectivity |
|---|---|---|---|---|---|---|---|
| 1,5-ND | ODA | (mils) | GTR | cB | GTR | cB | $H_2/CH_4$ |
| 100 | 0 | 2.71 | 3542 | 5759 | 144 | 234 | 25 |
| 75 | 25 | 2.70 | 3665 | 5937 | 116 | 188 | 32 |
| 50 | 50 | 2.55 | 2754 | 4213 | 87 | 133 | 32 |
| 25 | 75 | 0.95 | 6566 | 3743 | 129 | 74 | 51* |
| 0 | 100 | 1.78 | 2458 | 2625 | 45 | 48 | 55 |

*Cast from 10% solution

EXAMPLE 26

Part A

A polyamide was prepared using the procedure of the Richter and Hoehn patent mentioned above as shown in Example 6, Part A, with the exception that 11.5 mole percent (20 weight percent) of the m-phenylenediamine was replaced by a molecular equivalent amount of calcium sulfometaphenylenediamine of the formula

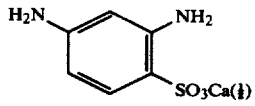

to obtain the corresponding copolyamide, referred to as MPD/CaSMPD-I/T (88.5/11.5-70/30).

Part B

Polyimide/polyamide blends were prepared by dissolving together in varying proportions the polyimide of Example 16, Part A and the polyamide of Part A above, the amounts of the two polymers being selected to give a total of 15% polymer weight in solution in dimethylacetamide. The resulting solutions were cast on Vydax® coated glass at 100° C. using a 25 mil doctor knife. The films were first dried for 5 minutes at 100° C. with the cover vents closed and then for 10 minutes with the vents open. The films were tested for permeation of hydrogen and methane as shown in Table VI.

TABLE VI

| wt % | | Thickness | $H_2$ Permeation | | $CH_4$ Permeation | | Selectivity |
|---|---|---|---|---|---|---|---|
| Polyimide | Polyamide | (mils) | GTR | cB | GTR | cB | $H_2/CH_4$ |
| 0 | 100 | 1.42 | 248 | 211 | 1 | 1 | 248 |
| 75 | 25 | 1.52 | 961 | 876 | 14 | 13 | 69 |
| 80 | 20 | 1.38 | 1203 | 996 | 13 | 11 | 93 |
| 85 | 15 | 1.39 | 1869 | 1559 | 58 | 48 | 32 |
| 90 | 10 | 1.28 | 1953 | 1500 | 35 | 27 | 56 |
| 95 | 5 | 1.46 | 2417 | 2117 | 56 | 49 | 43 |
| 100 | 0 | 1.78 | 2458 | 2625 | 45 | 48 | 55 |

EXAMPLE 27

Polyimide/polyamide blends were prepared by dissolving together in varying proportions the polyimide of Example 15, Part A and the polyamide of Example 26, Part A. Amounts of the two polymers were selected to give a total of 15% polymer weight in solution in dimethylacetamide. The resulting solutions were cast on Vydax® coated glass at 100° C. using a 25 mil doctor knife. The films were first dried for 5 minutes at 100° C. with the covers vents closed and then for 10 minutes with the vents open. The films were then tested for permeation of hydrogen and methane as shown in Table VII.

TABLE VII

| wt % in blend | | Thick- | $H_2$ | | $CH_4$ | | |
|---|---|---|---|---|---|---|---|
| Poly- | Poly- | ness | Permeation | | Permeation | | Selectivity |
| imide | amide | (mils) | GTR | cB | GTR | cB | $H_2CH_4$ |
| 50 | 50 | 1.39 | 1413 | 1178 | 48 | 40 | 29 |
| 75 | 25 | 1.43 | 2819 | 2419 | 100 | 86 | 28 |
| 80 | 20 | 1.47 | 3122 | 2754 | 136 | 120 | 23 |
| 85 | 15 | 1.38 | 3840 | 3180 | 139 | 115 | 28 |
| 90 | 10 | 1.44 | 4476 | 3867 | 195 | 168 | 23 |
| 95 | 5 | 1.47 | 5224 | 4608 | 212 | 187 | 25 |
| 100 | 0 | 2.71 | 3542 | 5759 | 144 | 235 | 25 |

EXAMPLE 28

The procedure of Example 19, Part B, was repeated except that the doctor knife thickness was varied in order to observe the effect of varying film thickness on the permeation of hydrogen and methane. Details of this study are shown in Table VIII.

TABLE VIII

| Thickness (mils) | | $H_2$ Permeation | | $CH_4$ Permeation | | Selectivity |
|---|---|---|---|---|---|---|
| Knife | Film | GTR | cB | GTR | cB | $H_2/CH_4$ |
| 3 | 0.23 | 16258 | 2244 | 126 | 17 | 129 |
| 10 | 0.50 | 9952 | 2986 | 173 | 52 | 58 |
| 15 | 0.73 | 6077 | 2662 | 97 | 42 | 63 |
| 25 | 1.61 | 3054 | 2950 | 70 | 68 | 44 |

EXAMPLE 29

The procedure of Example 20 was repeated except that the doctor knife thickness was varied in order to observe the effect of varying film thickness on the permeation of hydrogen and methane. Details of this study are shown in Table IX.

TABLE IX

| Thickness (mils) | | $H_2$ Permeation | | $CH_4$ Permeation | | Selectivity |
|---|---|---|---|---|---|---|
| Knife | Film | GTR | cB | GTR | cB | $H_2/CH_4$ |
| 15 | 0.70 | 5213 | 2189 | 96 | 40 | 54 |
| 20 | 0.95 | 4423 | 2521 | 90 | 51 | 49 |
| 25 | 1.30 | 3680 | 2870 | 66 | 52 | 56 |
| 30 | 1.58 | 2736 | 2594 | 51 | 49 | 54 |
| 40 | 2.28 | 2298 | 3144 | 49 | 67 | 47 |
| 50 | 4.69 | 774 | 2178 | 19 | 53 | 41 |

EXAMPLE 30

Poly(4-isopropyl-m-phenylene) isophthalamide

Part A

A glass reactor equipped with a stirrer, reflux condenser and dropping funnels was flamed out under vacuum and purged with nitrogen. Into the reactor was placed 83.62 g (0.567 mole) of 4-isopropylmetaphenylenediamine (cumene diamine). Dimethylacetamide (884.2 g) was added in two portions with stirring and the resulting solution was cooled to about 0° C. Isophthaloyl chloride (116.75 g, 0.575 mole) was added in small portions over a period of 6 hours, the reaction temperature being held in the range of 41° to 52° C. The reaction mixture was then drowned in ice and water with vigorous agitation. The precipitated polyamide was recovered by filtration and dried to constant weight. There was obtained 150 g of polyamide with inherent viscosity of 0.38. Inherent viscosities in this and the following Examples were measured at 0.1% weight/volume in dimethylacetamide at 25° C.

The repeating unit of the polyamide prepared as shown above was checked against requirements (a), (b) and (c) as follows:

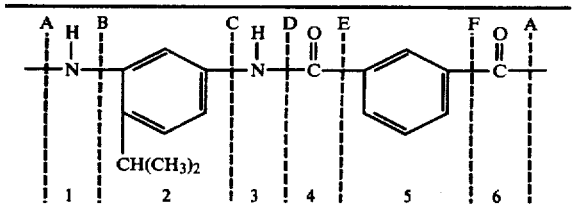

| Rigid Subunit | Colinearity | Restricted Bonds |
|---|---|---|
| 1 | N | B |
| 2 | N | B |
| 3 | N | — |
| 4 | N | — |
| 5 | N | — |
| 6 | N | — |

The repeating unit has six N subunits, one bond with restricted rotation, two of the N subunits have one bond with restricted rotation, and 12/16 of the main chain atoms are aromatic.

Part B

A solution of 40 g of the polyamide from Part A in 160 g of dimethylacetamide was filtered through a 0.45μ silver membrane, degassed and cast on a Vydax® coated glass plate at 110° C. with a 15-mil doctor knife. The film was covered and dried for 5 minutes at 110° C. with the cover vents closed and 10 minutes with the vents open. The film was stripped from the plate and air-dried. The 1.48-mil film permeated $H_2$ at 1104 GTR and 980 cB and $CH_4$ at 19 GTR and 17 cB. The $S_{H_2/CH_4}$ was 58.

EXAMPLE 31

The procedure of Example 30, Part B was repeated up to the stripping of the film from the plate. The stripped film was immersed in distilled water at room temperature for 20 hours and then in acetone for 1 hour. The film was then air-dried. The 1.51-mil film permeated $H_2$ at 951 GTR and 862 cB and $CH_4$ at 7 GTR and 6 cB. The $S_{H_2/CH_4}$ was 136.

EXAMPLE 32

The procedure of Example 30, Part B was repeated up to the stripping of the film from the plate. The stripped film was dried overnight under vaccum at room temperature. It was then immersed in distilled water for 2 hours, air-dried, and further dried under vacuum overnight at room temperature. The 1.58-mil film permeated $H_2$ at 721 GTR and 684 cB and $CH_4$ at 7 GTR and 7 cB. The $S_{H_2/CH_4}$ was 103.

EXAMPLE 33

The procedure of Example 30, Part B was repeated up to the stripping of the film from the plate. The stripped film was dried overnight under vaccum at room temperature. The film was then immersed first in distilled water at room temperature for 1 hour and then in acetone for 1 hour, after which it was air-dried and further dried under vacuum at room temperature overnight. The 1.46-mil film permeated $H_2$ at 943 GTR and 826 cB and $CH_4$ at 8 GTR and 7 cB. The $S_{H_2/CH_4}$ was 118.

EXAMPLE 34

Poly(4-isopropyl-m-phenylene) terephthalamide

Part A

Using the procedure of Example 30, Part A, a solution of 64.12 g (0.427 mole) of 4-isopropylmetaphenylenediamine in 678 g of dimethylacetamide was treated slowly with 86.65 g (0.427 mole) of terephthaloyl chloride during a period of 2.5 hours, keeping the reaction temperature in the range of 35° to 55° C. After the indicated recovery, there was obtained 111 g of polyamide of inherent viscosity 0.41.

The repeating unit of the polyamide prepared as above was checked against requirements (a), (b) and (c) as follows:

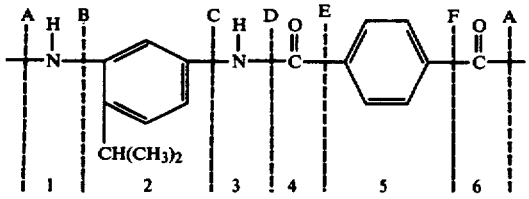

| Rigid Subunit | Colinearity | Restricted Bonds |
|---|---|---|
| 1 | N | B |
| 2 | N | B |
| 3 | N | — |
| 4 | N | — |
| 5 | L | — |
| 6 | N | — |

The repeating unit has five N and one L subunits, one bond with restricted rotation, two of the N subunits have one bond with restricted rotation and 12/16 of the main chain atoms are aromatic.

Part B

A solution of 15 g of the polyamide from Part A in 85 g of dimethylacetamide was filtered through a 0.45μ silver membrane, degassed and cast on a Vydax® coated glass plate at 110° C. with a 15-mil doctor knife. The film was covered and dried for 5 minutes at 110° C. with the cover vents closed and 10 minutes with the vents open. The film was stripped from the plate and air-dried. The 1.25-mil film permeated $H_2$ at 1240 GTR and 930 cB and $CH_4$ at 20 GTR and 15 cB. The $S_{H_2/CH_4}$ was 62.

EXAMPLE 35

Poly(4-isopropyl-m-phenylene) isophthalamide/terephthalamide

Part A

Using the procedure of Example 30, Part A, a solution of 47.37 g (0.35 mole) of 4-isopropylmetaphenylenediamine in 501 g of dimethylacetamide was treated slowly with 64.12 g (0.315 mole) of a 70/30 mixture of isophthaloyl chloride/terephthaloyl chloride during a period of 5 hours, keeping the reaction temperature in the range of 45° to 50° C. After the indicated recovery, there was obtained 86 g of copolyamide of inherent viscosity 0.53.

The repeating unit of the copolyamide prepared as shown above was checked against requirements (a), (b) and (c) as follows:

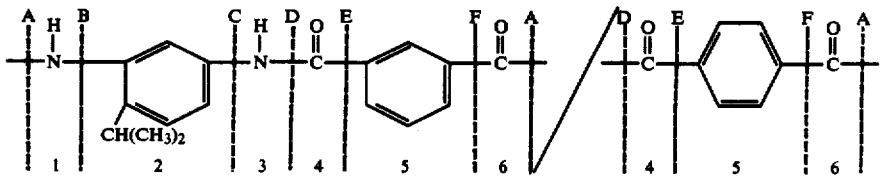

| Rigid Subunit | (I) Colinearity | (T) Restricted Bonds |
|---|---|---|
| 1 | N | B |
| 2 | N | B |
| 3 | N | — |
| 4 | N | — |
| 5 | N (I)<br>L (T) | — |
| 6 | N | — |

The repeating unit (I) has six N subunits. The repeating unit (T) has five N and one L subunits. In both (I) and (T), two of the N subunits have one bond with restricted rotation and 12/16 of the main chain atoms are aromatic.

Part B

A solution of 20 g of the copolyamide of Part A in 80 g of dimethylacetamide was filtered through a 0.45μ silver membrane, degassed and cast on a Vydax® coated glass plate at 110° C. with a 15-mil doctor knife. The film was covered, dried 5 minutes at 110° C. with the cover vents closed and then 10 minutes with the vents open. The air-dried 1.34-mil film permeated $H_2$ at 1103 GTR and 887 cB and $CH_4$ at 25 GTR and 20 cB. The $S_{H_2/CH_4}$ was 44.

EXAMPLE 36

Poly(1,5-naphthylene) isophthalamide/terephthalamide

Part A

Using the procedure of Example 30, Part A, a solution of 18.89 g (0.119 mole) of 1,5-naphthalenediamine in 195 g of dimethylacetamide was treated slowly with 24.24 g (0.119 mole) of a 70/30 mixture of isophthaloyl chloride/terephthaloyl chloride during a period of 2 hours, keeping the reaction temperature in the range of 40° to 43° C. After the indicated recovery, there was obtained 28 g of copolyamide of inherent viscosity 0.74.

The repeating unit of the copolyamide prepared as shown above was checked against requirements (a), (b) and (c) as follows:

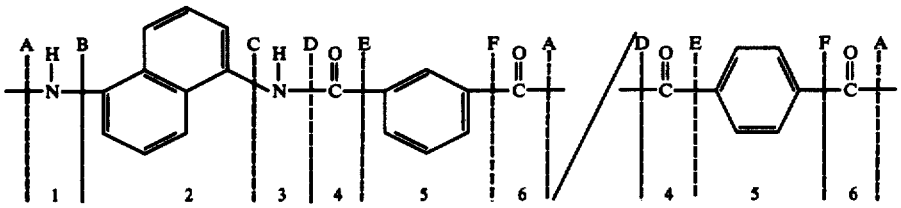

| Rigid Subunit | (I) Colinearity | (T) Restricted Bonds |
|---|---|---|
| 1 | N | B |
| 2 | N | B,C |
| 3 | N | C |
| 4 | N | — |
| 5 | N (I) | — |
| | L (T) | — |
| 6 | N | — |

The repeating unit (I) has six N subunits. The repeating unit (T) has five N and one L subunits. In both (I) and (T) three N subunits have at least one bond with restricted rotation and 16/20 of the main chain atoms are aromatic.

knife. The film was covered, dried 5 minutes at 110° C. with the cover vents closed and then 10 minutes with the vents open. The 0.94-mil air-dried film permeated $H_2$ at 1871 GTR and 1055 cB and $CH_4$ at 127 GTR and 72 cB. The $S_{H_2/CH_4}$ was 15.

EXAMPLE 37

Poly(3,3'-dimethyloxybiphenylene) isophthalamide/terephthalamide

Part A

Using the procedure of Example 30, Part A, a solution of 24.463 g of 3,3'-dimethoxybenzidine in 212 g of dimethylacetamide was treated slowly with 20.333 g of a 70/30 mixture of isophthaloyl chloride/terephthaloyl chloride during a period of 2.5 hours, keeping the reaction temperature in the range of 36° to 50° C. After the indicated recovery, there was obtained 35 g of copolyamide of inherent viscosity 1.80.

The repeating unit of the copolyamide prepared as shown above was checked against requirements (a), (b) and (c) as follows:

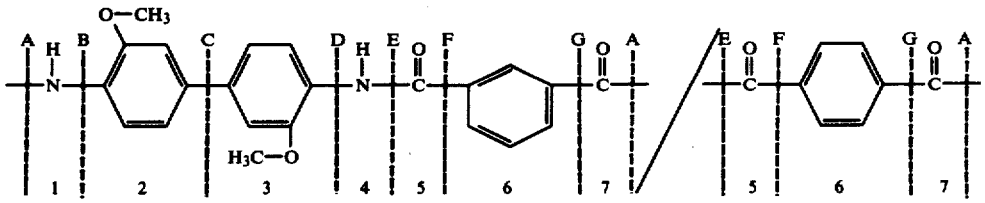

| Rigid Subunit | (I) Colinearity | (T) Restricted Bonds |
|---|---|---|
| 1 | N | B |
| 2 | L | B |
| 3 | L | D |
| 4 | N | D |
| 5 | N | — |
| 6 | N (I) | — |
| | L (T) | — |
| 7 | N | — |

Part B

A solution of 8 g of the copolyamide of Part A in 92 g of hexamethylphosphoramide was filtered through a 0.45μ silver membrane, degassed and cast on a Vydax® coated glass plate at 110° C. with a 25-mil doctor The repeating unit (I) has five N and two L subunits. The repeating unit (T) has four N and three L subunits. In both (I) and (T), two of the N subunits have one bond with restricted rotation and 18/22 of the main chain atoms are aromatic.

Part B

A solution of 15 g of the copolyamide of Part A in 85 g of dimethylacetamide was filtered through a 0.5μ silver membrane, degassed and cast on a Vydax® coated glass plate at 110° C. with a 25-mil doctor knife. The film was covered, dried 5 minutes at 110° C. with the cover vents closed and 10 minutes with the vents open. The 1.52-mil air-dried film permeated $H_2$ at 440 GTR and 401 cB and $CH_4$ at 6.1 GTR and 5.6 cB. The $S_{H_2/CH_4}$ was 72.

EXAMPLE 38

Poly(4,4'-[bis(trifluoromethyl)methylene]di-p-phenylene) isophthalamide/terephthalamide

Part A

Using the procedure of Example 30, Part A, a solution of 30.142 g of 4,4'-diaminodiphenylbis(trifluoromethyl)methane in 426 g of dimethylacetamide was treated slowly with 30.455 g of a 70/30 mixture of isophthaloyl chloride/terephthaloyl chloride during a period of 4.5 hours, keeping the reaction temperature in the range of 40° to 47° C. After the indicated recovery, there was obtained 68 g of copolyamide of inherent viscosity 1.37.

The repeating unit of the copolyamide prepared as shown above was checked against requirements (a), (b) and (c) as follows:

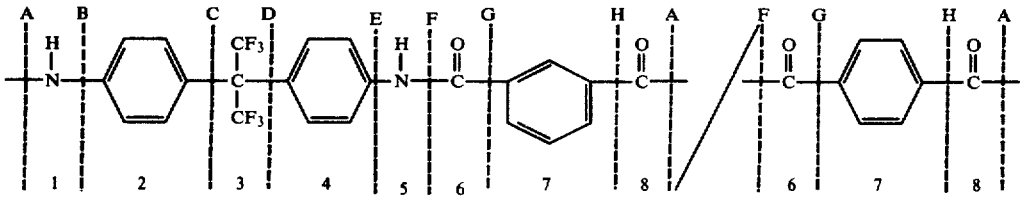

| (I) Rigid Subunit | Colinearity | (T) Restricted Bonds |
|---|---|---|
| 1 | N | — |
| 2 | L | C |
| 3 | N | C, D |
| 4 | L | D |
| 5 | N | — |
| 6 | N | — |
| 7 | N (I) | — |
| | L (T) | — |
| 8 | N | — |

The repeating unit (I) has six N and two L subunits. The repeating unit (T) has five N and three L subunits. In both (I) and (T), one of the N subunits has two bonds with restricted rotation and 18/23 of the main chain atoms are aromatic.

Part B

A solution of 15 g of the copolyamide of Part A in 85 g of dimethylacetamide was filtered through a 0.8μ silver membrane, degassed and cast on a Vydax® coated glass plate at 110° C. with a 15-mil doctor knife. The film was covered, dried 5 minutes at 110° C. with the cover vents closed and 10 minutes with the vents open. The 1.43-mil air-dried film permeated $H_2$ at 2304 GTR and 1977 cB and $CH_4$ at 41 GTR and 35 cB. The $S_{H_2/CH_4}$ was 56.

EXAMPLE 39

Poly[4,4'-benzylidenebis(2,5-diethoxy-p-phenylene)-]isophthalamide/terephthalamide

Part A

Using the procedure of Example 30, Part A, a solution of 18.475 g of 4,4'-diamino-2,5,2',5=-tetraethoxytriphenylmethane in 135 g of dimethylacetamide was treated slowly with 8.324 g of a 70/30 mixture of isophthaloyl chloride/terephthaloyl chloride during a period of 7 hours, keeping the reaction temperature in the range of 40° to 50° C. After the indicated recovery, there was obtained 23 g of copolyamide of inherent viscosity 0.81.

The repeating unit of the copolyamide prepared as shown above was checked against requirements (a), (b) and (c) as follows:

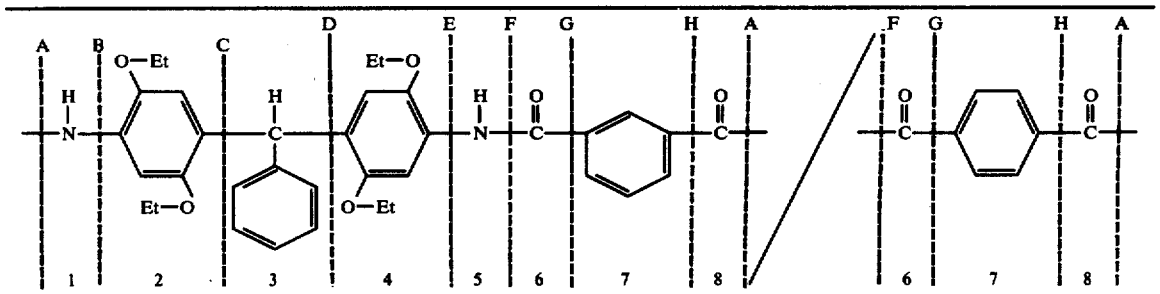

| Rigid Subunit (I) | Colinearity | Restricted Bonds (T) |
|---|---|---|
| 1 | N | B |
| 2 | L | B, C |
| 3 | N | C, D |
| 4 | L | D, E |
| 5 | N | E |
| 6 | N | — |
| 7 | N (I) | — |
| | L (T) | — |
| 8 | N | — |

The repeating unit I has six N and two L subunits. The repeating unit (T) has five N and three L subunits. In both (I) and (T), three of the N subunits have at least one restricted bond and 18/23 of the main chain atoms are aromatic.

C. The recovered polyamide had an inherent viscosity of 0.81.

The repeating unit of the polyamide prepared as shown above checked against requirements (a), (b), and (c) as follows:

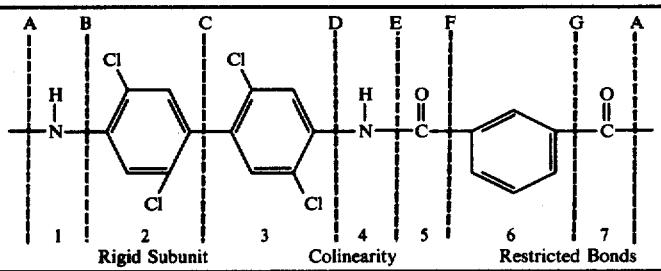

| Rigid Subunit | Colinearity | Restricted Bonds |
|---|---|---|
| 1 | N | B |
| 2 | L | B, C |
| 3 | L | C, D |
| 4 | N | D |
| 5 | N | — |
| 6 | N | — |
| 7 | N | — |

Part B

A solution of 15 g of the copolyamide of Part A in 60 g of dimethylacetamide was filtered through a 0.8μ silver membrane, degassed and cast on a Vydax® coated glass plate at 110° C. with a 15-mil doctor knife. The film was covered, dried 5 minutes at 110° C. with the cover vents closed and 10 minutes with the vents open. The 1.59-mil air-dried film permeated $H_2$ at 3641 GTR and 3474 cB and $CH_4$ at 226 GTR and 216 cB. The $S_{H_2/CH_4}$ was 16.

EXAMPLE 40

Poly(2,5,2′,5′-tetrachlorobiphenylene) isophthalamide

Part A

Using a procedure like that of Example 30, Part A, a polyamide was prepared from 32.203 g of 2,5,2′,5′-tetrachlorobenzidine and 20.302 g of isophthaloyl chloride in 170 ml of N-methylpyrrolidone solvent at 20° to 45°

The repeating unit has five N and two L subunits and three bonds with restricted rotation. Two of the N subunits each have one bond with restricted rotation and 18/22 of the main chain atoms are aromatic.

Part B

A solution of 15 g of the copolyamide of Part A in 85 g of dimethylacetamide was filtered through a 0.45μ silver membrane, degassed and cast on a Vydax® coated glass plate at 110° C. with a 15-mil doctor knife. The film was covered, dried 5 minutes with the cover vents closed and 10 minutes with the vents open. The film was stripped from the plate and dried under a vacuum of 2μ at room temperature overnight. The 0.73-mil film permeated $H_2$ at 1315 GTR and 576 cB and $CH_4$ at 18 GTR and 7.9 cB. The $S_{H_2/CH_4}$ was 73.

EXAMPLE 41

Poly(2,5,2',5'-tetrachlorobiphenylene) oxydibenzamide

Part A

Using a procedure like that of Example 30, Part A, a polyamide was prepared from 161.01 g of 2,5,2',5'-tetrachlorobenzidene and 147.56 g of the dichloride of oxydibenzoic acid in 1200 ml of dimethylacetamide solvent at 5° to 50° C. The recovered polyamide had an inherent viscosity 0.76.

The repeating unit of the copolyamide prepared as shown above was checked against requirements (a), (b) and (c) as follows:

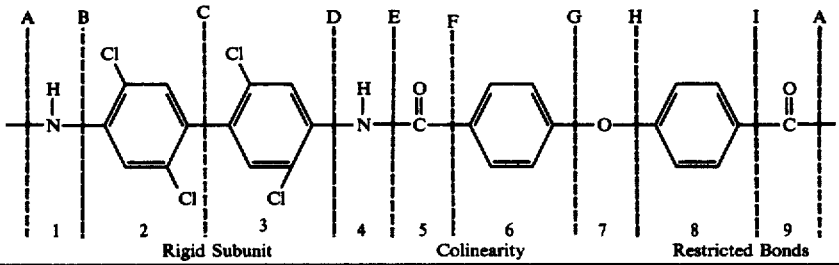

| Rigid Subunit | Colinearity | Restricted Bonds |
|---|---|---|
| 1 | N | B |
| 2 | L | B, C |
| 3 | L | C, D |
| 4 | N | D |
| 5 | N | — |
| 6 | L | — |
| 7 | N | — |
| 8 | L | — |
| 9 | N | — |

The repeating unit has five N and four L subunits and three bonds with restricted rotation. Two of the N subunits each have one bond with restricted rotation and 24/29 of the main chain atoms are aromatic.

Part B

A solution of 15 g of the polyamide of Part A in 85 g of dimethylacetamide was filtered through a 0.45μ silver membrane, degassed and cast on a Vydax® coated glass plate at 110° C. with a 25-mil doctor knife. The film was covered, dried 5 minutes at 110° C. with the cover vents closed and 10 minutes with the vents open. The film was stripped from the plate and dried under a vacuum of 2μ at room temperature overnight. The 1.48-mil film permeated $H_2$ at 609 GTR and 541 cB and $CH_4$ at 11 GTR and 9.8 cB. The $S_{H_2/CH_4}$ was 55.

EXAMPLE 42

Poly(4,6-dichloro-m-phenylene) isophthalamide/terephthalamide

Part A

In the manner of Example 41, Part A, a copolyamide was prepared from equimolar quantites of 4,6-dichlorometaphenylenediamine and a 70/30 mixture of isophthaloyl chloride/terephthaloyl chloride.

The repeating unit of the copolyamide noted above was checked against requirements (a), (b) and (c) as follows:

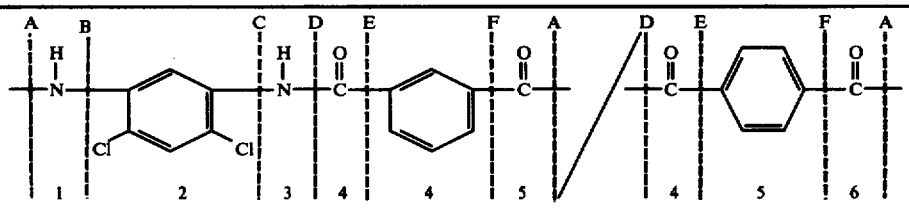

| Rigid Subunit (I) | Colinearity | Restricted Bonds (T) |
|---|---|---|
| 1 | N | B |
| 2 | N | B, C |
| 3 | N | C |
| 4 | N | — |
| 5 | N (I)<br>L (T) | —<br>— |
| 6 | N | — |

The repeating unit (I) has six N subunits. The repeating unit (T) has five N subunits and one L subunit. In both (I) and (T), three of the N subunits have at least one bond with restricted rotation and 12/16 of the main chain atoms are aromatic.

Part B

A solution of 20 g of the copolyamide of Part A in 80 g of dimethylacetamide was filtered through a 0.45μ silver membrane, degassed and cast on a Vydax® coated glass plate at 90° C. with a 15-mil doctor knife. The film was covered, dried 5 minutes at 90° C. with the cover vents closed and 10 minutes with the vents open. The air-dried 1.17-mil film permeated $H_2$ at 574 GTR and 403 cB and $CH_4$ at 7.4 GTR and 5.2 cB. The $S_{H_2/CH_4}$ was 78.

EXAMPLE 43

Poly(2,6-dichloro-p-phenylene) isophthalamide/terephthalamide

Part A

In the manner of Example 41, Part A, a copolyamide was prepared from equimolar quantities of 2,6-dichloroparaphenylenediamine and a 70/30 mixture of isophthaloyl chloride/terephthaloyl chloride.

The repeating unit of the copolyamide noted above was checked against requirements (a), (b) and (c) as follows:

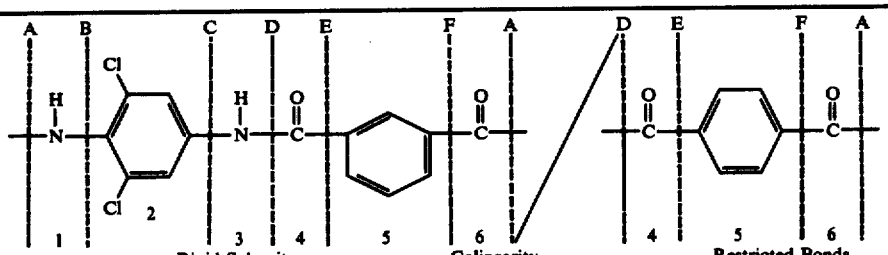

| Rigid Subunit | Colinearity | Restricted Bonds |
|---|---|---|
| 1 | N | B |
| 2 | L | B |
| 3 | N | — |
| 4 | N | — |
| 5 | N (I) | — |
| | L (T) | — |
| 6 | N | — |

The repeating unit (I) has five N and one L subunits. The repeating unit (T) has four N and two L subunits. In both (I) and (T), one N unit has one bond with restricted rotation and 12/16 of the main chain atoms are aromatic.

Part B

A solution of 15 g of the copolyamide of Part A in 85 g of dimethylacetamide was filtered through a 0.5μ silver membrane, degassed and cast on a Vydax® coated glass plate at 90° C. with a 25-mil doctor knife. The film was covered, dried 5 minutes at 90° C. with the cover vents closed and 10 minutes with the vents open. The air-dried 1.22-mil film permeated $H_2$ at 925 GTR and 677 cB and $CH_4$ at 13 GTR and 9.5 cB. The $S_{H_2/CH_4}$ was 71.

EXAMPLE 44

Poly[(3,3'-dichlorobiphenylene)/(m-phenylene)]isophthalamide

Part A

In the manner of Example 41, Part A, a copolyamide was prepared from equimolar quantites of isophthaloyl chloride and a 50/50 (molar) mixture of metaphenylenediamine and 3,3'-dichlorobenzidine.

The repeating unit of the copolyamide noted above was checked against requirements (a), (b) and (c) as follows:

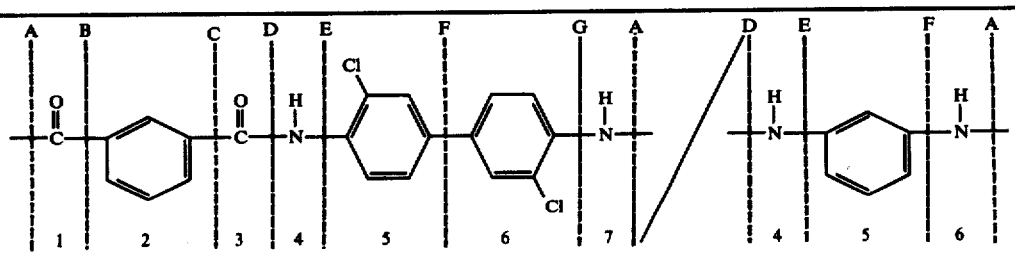

| | (DClPP) Rigid Subunit | Colinearity | (MPD) Restricted Bonds |
|---|---|---|---|
| (DClPP) | 1 | N | — |
| | 2 | N | — |
| | 3 | N | — |
| | 4 | N | E |
| | 5 | L | E |
| | 6 | L | G |
| | 7 | N | G |
| (MPD) | 4 | N | — |
| | 5 | N | — |
| | 6 | N | — |

The repeating unit (DClPP) which constitutes 50% of the polymer has five N and two L subunits and two bonds with restricted rotation. Two of the N units each have one bond with restricted rotation and 18/22 of the main chain atoms are aromatic.

Part B

A solution of 10 g of the copolyamide of Part A in 90 g of hexamethylphosphoramide was filtered through a 0.5μ silver membrane, degassed and cast on a Vydax® coated glass plate at 110° C. with a 25-mil doctor knife. The film was covered, dried 5 minutes at 110° C. with the cover vents closed, 10 minutes with the vents open and 10 minutes with the cover removed. The film was cooled on the plate for 10 minutes, stripped and dried under a vacuum of 2μ at room temperature overnight. The 1.28-mil film permeated $H_2$ at 726 GTR and 558 cB and $CH_4$ at 27 GTR and 21 cB. The $S_{H_2/CH_4}$ was 27.

The embodiments of the invention in which an exclusive property or privilege is claimed are defined as follows:

1. The process of separating [fluids] *a mixture of gases* using a semipermeable membrane of which at least 50% by weight consists essentially of a polymer whose main chain has a repeating unit containing at least one group selected from the group consisting of aromatic imide, aromatic ester and aromatic amide groups, in which said repeating unit (a) contains at least one rigid divalent subunit, the two main chain single bonds extending from which are not colinear, (b) is sterically unable to rotate 360° around one or more of said main chain single bonds, and (c) has more than 50% of its main chain atoms in aromatic groups, the said aromatic imide repeating unit having the formula

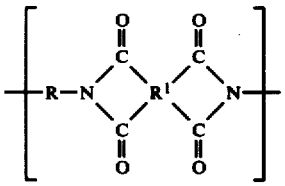

R and $R^1$ are, respectively, a divalent and tetravalent organic radical, the said aromatic ester repeating unit having the formula

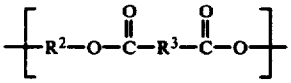

wherein each of $R^2$ and $R^3$, alike or different, is a divalent organic radical, and the said aromatic amide repeating unit having the formula

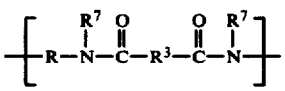

wherein R and $R^3$ are as defined above and $R^7$ is hydrogen, lower alkyl or phenyl.

2. The process of separating [fluids] *gases* of claim 1 in which the polymer is a polyimide.

3. The process of separating [fluids] *gases* of claim 2 in which the polymer is polypyromellitimide of 4-isopropyl-1,3-diaminobenzene.

4. The process of separating [fluids] *gases* of claim 2 in which the polymer is poly(4,4'-[bis(trifluoromethyl)-methylene]dibenzene-1,2,1',2'-tetracarboxylic diimide) of 1,5-naphthylenediamine.

5. The process of separating [fluids in 173 *gases* [in] *of* claim 2 in which the polymer is poly(4,4'-[bis(trifluoromethyl)methylene]dibenzene-1,2,1',2'-tetracarboxylic diimide) of 4,5-diaminodiphenyl ether.

6. The process of separating [fluids] *gases* of claim 2 in which the polymer is poly(4,4'-[bis(trifluoromethyl)-methylene]dibenzene-1,2,1',2'-tetracarboxylic diimide) of metaphenylenediamine.

7. The process of separating [fluids] *gases* of claim 2 in which the polymer is poly(4,4'-[bis(trifluoromethyl)-methylene]dibenzene-1,2,1',2'-tetracarboxylic diimide) of paraphenylenediamine.

8. The process of separating [fluids] *gases* of claim 1 in which the polymer is a polyester.

9. The process of separating [fluids] *gases* of claim 8 in which the polymer is poly[4,4'-(ditrifluoromethylmethylene)dibenzene-1,1'-diyl] isophthalate/terephthalate.

10. The process of separating [fluids] *gases* of claim 8 in which the polymer is poly[4,4'-(ditrifluoromethylmethylene)di(2,6-dichlorobenzene)-1,1'-diyl] isophthalate/terephthalate.

11. The process of separating [fluids] *gases* of claim 8 in which the polymer is poly[4,4'-(ditrifluoromethylmethylene)di(2,6-dibromobenzene)-1,1'-diyl] isophthalate/terephthalate.

12. The process of separating [fluids] *gases* of claim 8 in which the polymer is poly[4,4'-dimethylmethylene)di(2,6-chlorobenzene)-1,1'-diyl] isophthalate/-terephthalate.

13. The process of separating [fluids] *gases* of claim 8 in which the polymer is poly[4,4'-(dimethylmethylene)di(2,6-dichlorobenzene)-1,1'-diyl] isophthalate/terephthalate.

14. The process of separating [fluids] *gases* of claim 1 in which the polymer is a polyamide.

15. The process of separating [fluids] *gases* of claim 14 in which the polymer is poly(4,4'-[bis(trifluoromethyl)methylene]di-p-phenylene) isophthalamide/-terephthalamide.

16. The process of separating [fluids] *gases* of claim 14 in which the polymer is poly(4-isopropyl-m-phenylene) isophthalamide.

17. The process of separating [fluids] *gases* of claim 14 in which the polymer is poly(2,5,2',5'-tetrachlorobiphenylene) isophthalamide.

18. The process of separating [fluids] *gases* of claim 14 in which the polymer is poly(1,5-naphthylene) isophthalamide/terephthalamide.

19. The process of separating [fluids] *gases* of claim 14 in which the polymer is poly(4,6-dichloro-m-phenylene) isophthalamide/terephthalamide.

20. The process of separating [fluids] *gases* of claim 14 in which the polymer is poly(2,6-dichloro-p-phenylene) isophthalamide/terephthalamide.

21. The process of separating [fluids] *gases* of claim 14 in which the polymer is poly[(3,3'-dichlorobiphenylene)/(m-phenylene)] isophthalamide.

[22. The process of separating fluids of claim 1 in which the fluid is a mixture of gases.]

23. The process of separating [fluids] *gases* of claim [22] *1* in which the polymer is a polyimide.

24. The process of separating [fluids] *gases* of claim [22] *1* in which the polymer is a polyester.

25. The process of separating [fluids] *gases* of claim [22] *1* in which the polymer is a polyamide.

[26. A fluid-separation apparatus comprising:

a fluid-permeation cell;

a fluid inlet and a fluid outlet connected to said cell; and a semipermeable membrane dividing the cell between the inlet and the outlet;

at least 50% by weight of said membrane consisting essentially of a polymer whose main chain has a repeating unit containing at least one group selected from the group consisting of aromatic imide, aromatic ester and aromatic amide groups, in which said repeating unit (a) contains at least one rigid divalent subunit, the two main chain single bonds extending from which are not colinear, (b) is sterically unable to rotate 360° around one or more of said main chain single bonds, and (c) has more than 50% of its main chain atoms in aromatic groups, the said aromatic imide repeating unit having the formula

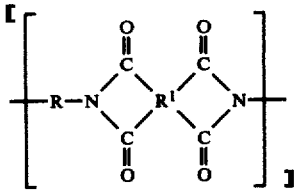

wherein R and $R^1$ are, respectively, a divalent and tetravalent organic radical, the said aromatic ester repeating unit having the formula

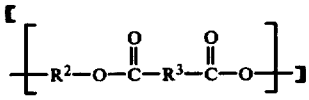

wherein each of $R^2$ and $R^3$, alike or different, is a divalent organic radical, and the said aromatic amide repeating unit having the formula

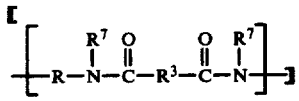

wherein R and $R^3$ are as defined above and $R^7$ is hydrogen, lower alkyl or phenyl.]

[27. The fluid-separation apparatus of claim 26 in which the polymer is a polyimide.]

[28. The fluid-separation apparatus of claim 26 in which the polymer is a polyester.]

[29. The fluid-separation apparatus of claim 26 in which the polymer is a polyamide.]

* * * * *